US011075865B2

(12) United States Patent
Jiang et al.

(10) Patent No.: US 11,075,865 B2
(45) Date of Patent: Jul. 27, 2021

(54) METHOD AND APPARATUS FOR TRANSMITTING BUSINESS OBJECT

(71) Applicant: Alibaba Group Holding Limited, Grand Cayman (KY)

(72) Inventors: Xueting Jiang, Hangzhou (CN); Junyuan Liu, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 58 days.

(21) Appl. No.: 15/836,747

(22) Filed: Dec. 8, 2017

(65) Prior Publication Data

US 2018/0097754 A1 Apr. 5, 2018

Related U.S. Application Data

(63) Continuation of application No. PCT/CN2016/084597, filed on Jun. 3, 2016.

(30) Foreign Application Priority Data

Jun. 11, 2015 (CN) .......................... 201510320623.1

(51) Int. Cl.
*H04L 12/58* (2006.01)
*G06F 3/0481* (2013.01)
(Continued)

(52) U.S. Cl.
CPC .......... *H04L 51/046* (2013.01); *G06F 3/0481* (2013.01); *G06F 3/0488* (2013.01);
(Continued)

(58) Field of Classification Search
CPC . H04L 51/046; G06F 3/0481; G06F 3/04845; G06F 3/04847; G06F 3/0488;
(Continued)

(56) References Cited

U.S. PATENT DOCUMENTS 7,761,507 B2 * 7/2010 Herf ..................... H04L 12/1822
709/204
7,933,956 B2 * 4/2011 Hon ........................ G06F 16/44
709/205
(Continued)

FOREIGN PATENT DOCUMENTS

CN 1928859 A 3/2007
CN 101163118 4/2008
(Continued)

OTHER PUBLICATIONS

Translation of International Search Report from corresponding PCT application No. PCT/CN2016/084597 dated Sep. 2, 2016, 2 pages.
(Continued)

*Primary Examiner* — Philip J Chea
*Assistant Examiner* — Hassan A Khan
(74) *Attorney, Agent, or Firm* — Lee & Hayes, P.C.

(57) ABSTRACT

Methods and apparatuses of transmitting a business object are disclosed. A first client has a communication connection established with a second client, and includes a user interface containing a first display region and a second display region. The first display region is used for displaying a first business object, and the second display region is used for conducting instant communications with the second client. The first client sends information of a first business object to the second client according to a sharing request, performs an operation on the first business object in the user interface of the first client based on an operation command for the first business object of the first client, and sends the operation command to the second client, to cause the second client to perform the operation on the first business object in a user interface of the second client according to the operation command.

20 Claims, 20 Drawing Sheets

(51) Int. Cl.
*G06F 3/0484* (2013.01)
*G06F 3/0488* (2013.01)
*G06Q 30/06* (2012.01)
*H04M 1/72403* (2021.01)

(52) U.S. Cl.
CPC ...... *G06F 3/04845* (2013.01); *G06F 3/04847* (2013.01); *G06Q 30/0643* (2013.01); *G06F 2203/04803* (2013.01); *H04M 1/72403* (2021.01)

(58) Field of Classification Search
CPC ..... G06F 2203/04803; G06Q 30/0643; H04M 1/72522
See application file for complete search history.

(56) References Cited

U.S. PATENT DOCUMENTS

| | | | | |
|---|---|---|---|---|
| 2004/0103151 | A1* | 5/2004 | Ettinger | H04L 69/329 709/205 |
| 2005/0193062 | A1* | 9/2005 | Komine | G06Q 10/10 709/204 |
| 2008/0091778 | A1* | 4/2008 | Ivashin | G06Q 10/10 709/204 |
| 2009/0035733 | A1* | 2/2009 | Meitar | G09B 7/00 434/118 |
| 2009/0287588 | A1* | 11/2009 | Ourega Dobe | G06Q 30/0603 705/26.1 |
| 2010/0050092 | A1* | 2/2010 | Williams | G06F 3/0481 715/753 |
| 2011/0289155 | A1* | 11/2011 | Pirnazar | H04L 65/1009 709/206 |
| 2012/0251997 | A1* | 10/2012 | Kojo | G09B 7/07 434/379 |
| 2013/0132240 | A1* | 5/2013 | Aguilar | G06Q 30/00 705/27.2 |
| 2013/0311906 | A1* | 11/2013 | Mackin | H04L 51/32 715/758 |
| 2014/0057243 | A1* | 2/2014 | Yamaguchi | G09B 5/12 434/362 |
| 2014/0108178 | A1* | 4/2014 | Cao | G06F 3/048 705/26.2 |

FOREIGN PATENT DOCUMENTS

| | | |
|---|---|---|
| CN | 101729435 A | 6/2010 |
| CN | 101795240 A | 8/2010 |
| CN | 102075448 | 5/2011 |
| CN | 102132310 | 7/2011 |
| CN | 102779306 | 11/2012 |
| JP | 2001318870 A | 11/2001 |
| JP | 2005242899 A | 9/2005 |
| JP | 2007087303 A | 4/2007 |
| JP | 2013522804 A | 6/2013 |

OTHER PUBLICATIONS

Translation of Written Opinion from corresponding PCT application No. PCT/CN2016/084597 dated Sep. 2, 2016, 6 pages.
English-language translation of First Office Action dated Mar. 5, 2019 by the Sate Intellectual Property Office of the People's Republic of China in corresponding Application No. 201510320623 (30 pages).
First Search Report dated Mar. 5, 2019 by the State Intellectual Property Office of the People's Republic of China in corresponding Application No. 2015103206231 (2 pages).
The Japanese Office Action dated May 26, 2020 for Japanese Patent Application No. 2017-563936, a counterpart foriegn application of the U.S. Appl. No. 15/836,747, 9 pages.

* cited by examiner

METHOD AND APPARATUS FOR TRANSMITTING BUSINESS OBJECT

CROSS REFERENCE TO RELATED PATENT APPLICATIONS

This application claims priority to and is a continuation of PCT Patent Application No. PCT/CN2016/084597 filed on 3 Jun. 2016, and is related to and claims priority to Chinese Patent Application 201510320623.1, filed on Jun. 11, 2015, entitled "Method and Apparatus for Transmitting Business object," which are hereby incorporated by reference in their entirety.

TECHNICAL FIELD

The present disclosure relates to the technological field of data processing, and particularly to methods and apparatuses for transmitting a business object.

BACKGROUND

Along with the development of the Internet, sharing information of interest with chatting objects using chatting tools anywhere at any time has been a main approach of information sharing. Most of the information of interest to be shared is business objects obtained by users through browsing tools. These business objects may include description information of products. In general, a process of transmitting a business object for implementing information sharing includes the following operations.

First operation: A browser opens a business object, and determines that the opened business object is a business object of interest.

Second operation: A system receives a copy command of a link of the business object displayed in an address field of a window of the browser.

Third operation: A chatting tool receives an open command, and opens a chatting window for a chatting object.

The above second and third operations perform a window switching, switching the browsing window of the browser to the chatting window of the chatting tool.

Fourth operation: The chatting tool receives a paste command, and pastes the link of the business object in a paste board into an information sending field of the chatting window.

Fifth operation: The chatting tool receives a send commend, and sends the network link in the information sending field to the chatting object.

In this case, after receiving the business object, the chatting object opens the link of the business object using a browsing tool to view the business object pointed by the link of the business object.

Sixth operation: The browser receives an open command again, and opens business object(s) that has/have been browsed.

At this time, a user can continue to browse the business object(s) that is/are of interest.

The above fifth and sixth operations perform a window switching, switching the chatting window to the browsing window.

The above process of transmitting a business object implements sharing of a business object that is of interest. However, a party that initiates the chatting needs to use two application programs—a chatting tool and a browsing tool, and can achieve sharing of a business object that is of interest through switching between windows of the two application programs and a series of operations which include related copying, pasting and sending. Each time when a business object that is of interest is shared, two operations of window switching, one series of operations of copying, pasting and sending are performed. If N business objects of interest are to be shared, 2N number of window switching, and N series of operations of copying, pasting and sending are needed to be performed. This leads to a relatively low efficiency of transmission, tedious operations and poor user experience for the above method of transmitting a business object, and does not facilitate sharing of business objects of interest. These problems become more apparent when devices having relatively limited operation interfaces and operation means such as a mobile phone, a pad, etc., are used for performing the above process of transmitting a business object.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide methods and apparatuses of transmitting a business object, which are used for solving the problems of low transmission efficiency and tedious operations when information of interest is shared using a chatting tool in existing technologies.

A method of transmitting a business object includes establishing a communication connection between a first client and a second client, wherein a user interface of the first client includes a first display region and a second display region, the first display region being used for displaying a first business object, and the second display region being used for conducting instant communications between the first client and the second client; sending information of a first business object to the second client by the first client according to a sharing request, to cause the second client to display the first business object in a user interface of the second client; performing an operation on the first business object in the user interface of the first client based on an operation command for the first business object of the first client in response to receiving the operation command; and sending the operation command to the second client, to cause the second client to perform the operation on the first business object in the user interface of the second client according to the operation command.

A method of transmitting a business object includes establishing a communication connection between a first client and a second client, wherein a user interface of the second client includes a first display region and a second display region, the first display region being used for displaying a second business object, and the second display region being used for conducting instant communications between the first client and the second client; receiving a sharing request from the first client by the second client; receiving information of a first business object from the first client; obtaining the first business object using the information of the first business object; generating a first display sub-region and a second display sub-region in the first display region of the second client; displaying the first business object that is obtained in the first display sub-region or the second display sub-region; and performing an operation on the first business object in the user interface of the second client according to an operation command for the first business object of the first client in response to receiving the operation command from the first client.

A method of transmitting a business object includes establishing communication connections between a first client and at least two second clients, wherein a user interface of the first client includes a first display region and a second display region, the first display region being used for displaying a first business object, and the second display region being used for conducting instant communications between the first client and the at least two second clients; sending information of a first business object to a plurality of second clients by the first client according to a sharing request, to cause the plurality of second clients to display the first business object in respective user interfaces; performing an operation on the first business object in the user interface of the first client based on an operation command for the first business object of the first client in response to receiving the operation command; and sending the operation command to the plurality of second clients, to cause the plurality of second clients to perform the operation on the first business object in the respective user interfaces according to the operation command.

A method of transmitting a business object includes establishing communication connections between at least two first clients and a second client, wherein a user interface of the second client includes a first display region and a second display region, the first display region being used for displaying a second business object, and the second display region being used for conducting instant communications between the at least two first clients and the second client; receiving sharing requests from a plurality of first clients by the second client; receiving pieces of information of first business objects from the plurality of first clients; obtaining the first business objects using the pieces of the information of the first business objects, wherein a first business object that is obtained is a first business object of a first client corresponding to a respective piece of the information of the first business objects; generating at least two display sub-regions in the first display region; displaying the second business object of the second client and the first business objects that are obtained in the at least two display sub-regions; and for a first client of the plurality of first clients, performing an operation on a first business object of the first client in the user interface of the second client according to an operation command for the first business object of the first client in response to receiving the operation command from the first client.

A first client, the first client having a communication connection established with a second client, wherein a user interface of the first client includes a first display region and a second display region, the first display region being used for displaying a first business object, and the second display region being used for conducting instant communications between the first client and the second client. The first client includes a first sending unit used for sending information of a first business object to the second client according to a sharing request, to cause the second client to display the first business object in a user interface of the second client; an execution unit used for performing an operation on the first business object in the user interface of the first client based on an operation command for the first business object of the first client in response to receiving the operation command; and a second sending unit used for sending the operation command to the second client, to cause the second client to perform the operation on the first business object in the user interface of the second client according to the operation command.

A second client, the second client having a communication connection established with a first client, wherein a user interface of the second client includes a first display region and a second display region, the first display region being used for displaying a second business object, and the second display region being used for conducting instant communications between the first client and the second client. The second client includes a first receiving unit used for receiving a sharing request from the first client; a second receiving unit used for receiving information of a first business object from the first client; an acquisition unit used for obtaining the first business object using the information of the first business object; a generation unit used for generating a first display sub-region and a second display sub-region in the first display region of the second client; a display unit used for displaying the first business object that is obtained in the first display sub-region or the second display sub-region; and an execution unit used for performing an operation on the first business object in the user interface of the second client according to an operation command for the first business object of the first client in response to receiving the operation command from the first client.

A first client, having communication connections established between the first client and at least two second clients, wherein a user interface of the first client includes a first display region and a second display region, the first display region being used for displaying a first business object, and the second display region being used for conducting instant communications between the first client and the at least two second clients. The first client includes a first sending unit used for sending information of a first business object to a plurality of second clients according to a sharing request, to cause the plurality of second clients to display the first business object in respective user interfaces; an execution unit used for performing an operation on the first business object in the user interface of the first client based on an operation command for the first business object of the first client in response to receiving the operation command; and a second sending unit used for sending the operation command to the plurality of second clients, to cause the plurality of second clients to perform the operation on the first business object in the respective user interfaces according to the operation command.

A second client, having communication connections established between at least two first clients and the second client, wherein a user interface of the second client includes a first display region and a second display region, the first display region being used for displaying a second business object, and the second display region being used for conducting instant communications between the at least two first clients and the second client. The second client includes a first receiving unit used for receiving sharing requests from a plurality of first clients; a second receiving unit used for receiving pieces of information of first business objects from the plurality of first clients; an acquisition unit used for obtaining the first business objects using the pieces of the information of the first business objects, wherein a first business object that is obtained is a first business object of a first client corresponding to a respective piece of the information of the first business objects; a generation unit used for generating at least two display sub-regions in the first display region; a display unit used for displaying the second business object of the second client and the first business objects that are obtained in the at least two display sub-regions; and an execution unit used for, for a first client of the plurality of first clients, performing an operation on a first business object of the first client in the user interface of the second client according to an operation command for the first business object of the first client in response to receiving the operation command from the first client.

In the solutions of the embodiments of the present disclosure, for a first client, on the one hand, since a user interface of the first client includes a first display region used for displaying a first business object, the first client directly sends information of the first business object to a second client when sharing of the first business object is needed. Furthermore, in response to receiving an operation command for the first business object of the first client, the first client performs an operation on the first business object in the user interface of the first client, and sends the operation command to the second client, to enable the first client and the second client to browse the first business object and a change caused by the operation of the first client on the first business object synchronously. On the other hand, since the user interface of the first client also includes a second display region used for conducting instant communications with the second client, the solutions of the embodiments of the present disclosure can synchronize browsing the first business object and a change caused by the operation of the first client on the first business object, and also use the second display region to conduct instant communications with the second client at the same time. Accordingly, the first client does not need to perform window switching regardless of how many times sharing of first business objects (information of interest) between the first client and the second client are performed. Moreover, a series of operations of copying, pasting and sending of links of first business objects are no longer needed. Therefore, preparation of operations of transmitting business objects is simplified, and the efficiency of transmitting the business objects is improved.

For a second client, on the one hand, a user interface thereof includes a first display region. After information of a first business object is received from a first client, the first business object is obtained and displayed in the first display region, thus implementing browsing of the first business object of the first client. Furthermore, in response to receiving an operation command for the first business object from the first client, an operation is performed on the first business object in the user interface of the second client according to the operation command, to cause and enable the second client to synchronously browse the first business object and a change caused by the operation of the first client on the first business object in real time. On the other hand, the user interface of the second client also includes a second display region used for instant communications between the first client and the second client. This enables the second client to synchronize browsing the first business object and the change caused by the operation of the first client on the first business object, and to also use the second display region to conduct instant communications with the first client at the same time. Accordingly, the second client does not need to perform window switching regardless of how many times sharing of first business objects (information of interest) by the first client are performed. Preparation of operations of transmitting business objects is simplified, and the efficiency of transmitting the business objects is improved.

DETAILED DESCRIPTION

Figure 1:
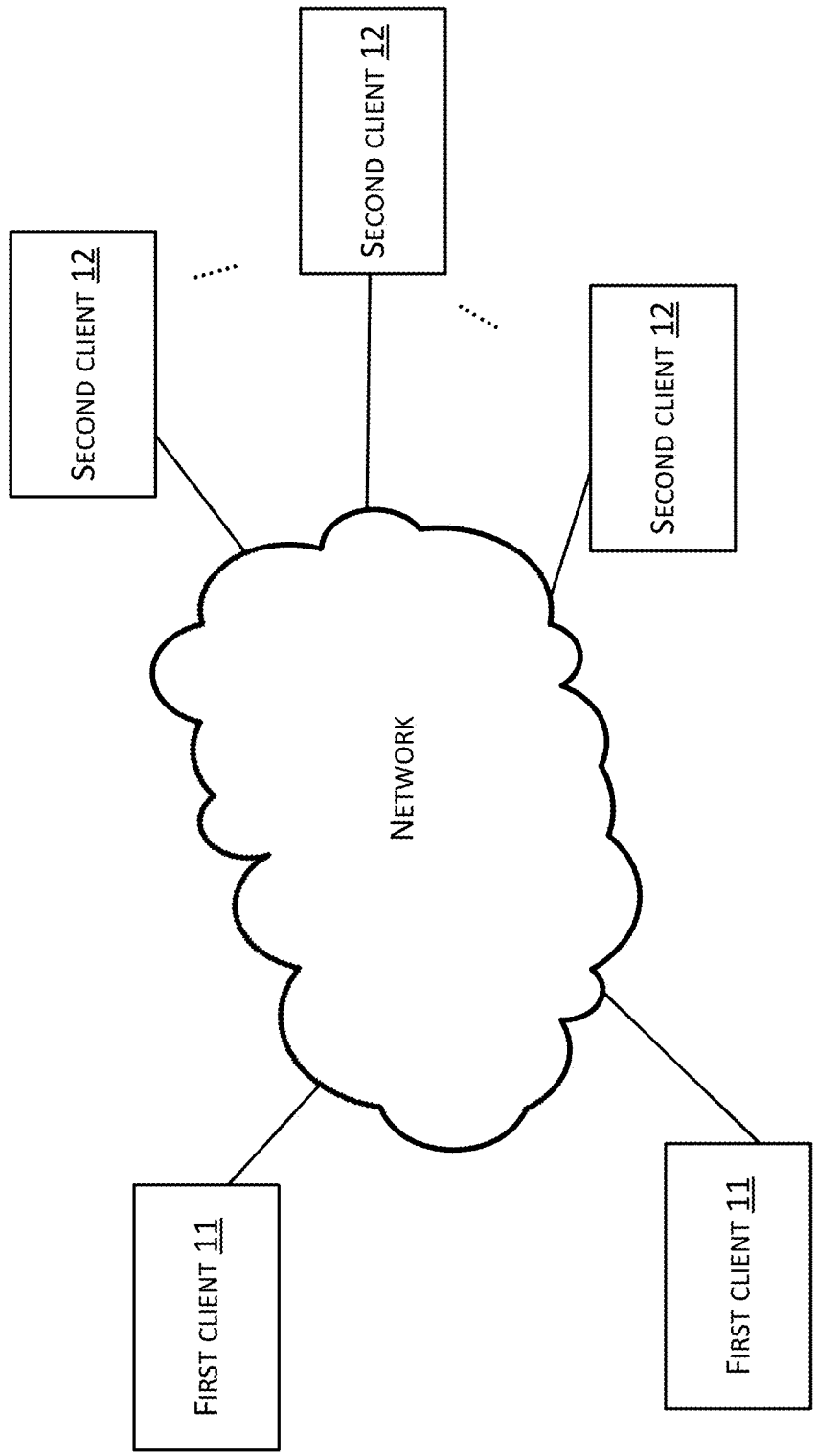
FIG. 1 shows a schematic structural diagram of a system of transmitting a business object in accordance with the embodiments of the present disclosure.

The embodiments of the present disclosure provide methods and apparatuses of transmitting a business object, which are used for solving the problems of low transmission efficiency and tedious operations when information of interest is shared using a chatting tool in existing technologies.

Exemplary embodiments are described herein in conjunction with accompanying drawings of the disclosure. It should be noted that the exemplary embodiments described herein are merely used for describing and explaining the present disclosure, and are not intended to limit the present disclosure. Under situations in which any conflicts exist, the embodiments and features in the embodiments of the present disclosure can be mutually combined.

Important concepts involved in the embodiments of the present disclosure are explained herein first.

A business object may include description information of a product. Examples include one or more of an image of a product, a price of the product, a specification about the product, a place of manufacture of the product, the materials of the product, a text of the product, or image and comment information, etc.

Information of a business object may be an identifier of the business object, and may also be a link of the business object. A web page corresponding to the link of the business object includes description information of the business object. The link of the business object may generally be a URL (Uniform/Universal Resource Locator), and may be a web address of the business object, for example.

The embodiments of the present disclosure take into account of the need of a user U11 to share business object(s) of interest with a user U21 when browsing the business object(s) of interest, and the need of receiving and sending instant communication messages in accordance with changes caused by operations on the content included in the business object(s), to help the user U11 to give comments on the business object(s) of interest in a well-targeted and efficient manner and to further obtain comments of the user U21 on the business object(s) of interest (with the user U21 may also have the same needs). Therefore, user interfaces of a first client A1 used by the user U11 and a second client B1 used by the user U21 are both configured with a first display region and a second display region respectively. A display region of the first client A1 is used for displaying a first business object. The first business object may be understood as a business object that is currently of interest to the user U11. A second display region of the first client A1 is used for displaying instant communication messages that are received from the second client B1, and instant communication messages that are sent to the second client B1. A first display region of the second client is used for displaying a second business object. The second business object can be understood as a business object that is currently of interest to the user U21. A second display region of the second client B1 is used for displaying instant communication messages that are received from the first client A1, and instant communication messages that are sent to the first client A1. In this way, the user U11 can then browse business objects using the first display region of the first client, and send a sharing request to the second client B1 directly using the first client A1 when browsing a business object that is of interest. The first client A1 shares information of the business object (i.e., the browsed business object that is of interest to the user U11) displayed in the first display region of a user interface thereof to the second client B1. In order to coordinate a change caused by an operation on the content included in the business object of interest and comments given by the user U21 on the business object of interest in a well-targeted and efficient manner, the first client A1 performs the operation on the business object of interest in the user interface of the first client A1 according to an operation command for sharing the business object of interest in response to receiving the operation command, and sends the operation to the second client B1, to cause the second client to follow the operation command. At this same time, the second client B1 can perform the operation on the first business object according to the operation command. In this way, the user U21 can see the change caused by the operation of the user U11 on the shared business object that is of interest, and quickly understand an instant communication message sent from the user U11 in conjunction with the change, thus conducting highly efficient communications and achieving an effect of face-to-face communications.

In the above solution, a user U1 needs to use a first client A only, and a user U2 needs to use a second client B only. Sharing of business objects can be performed while instant communication messages can be received and sent, without the needs of window switching and copying and pasting operations. Furthermore, the first client A can also send an operation command for a shared business object of interest and to the second client B. In this case, the first client A and the second client B can synchronously display a change caused by the operation on the shared business object of interest. This enables the user U1 and the user U2 to incorporate this change, and to receive and send instant communication messages, thus leading to highly efficient communications.

The solution of the embodiments of the present disclosure can be applied to a system as shown in FIG. 1. The system includes at least one first client 11 and at least one second client 12.

The at least one first client 11 and the at least one second client 12 mutually establish a communication connection. FIG. 1 shows a communication connection mutually established between the first client 11 and the second client 12 through a network. Apparently, the first client 11 and the second client 12 can establish a mutual communication connection without going through a network.

Figure 2:
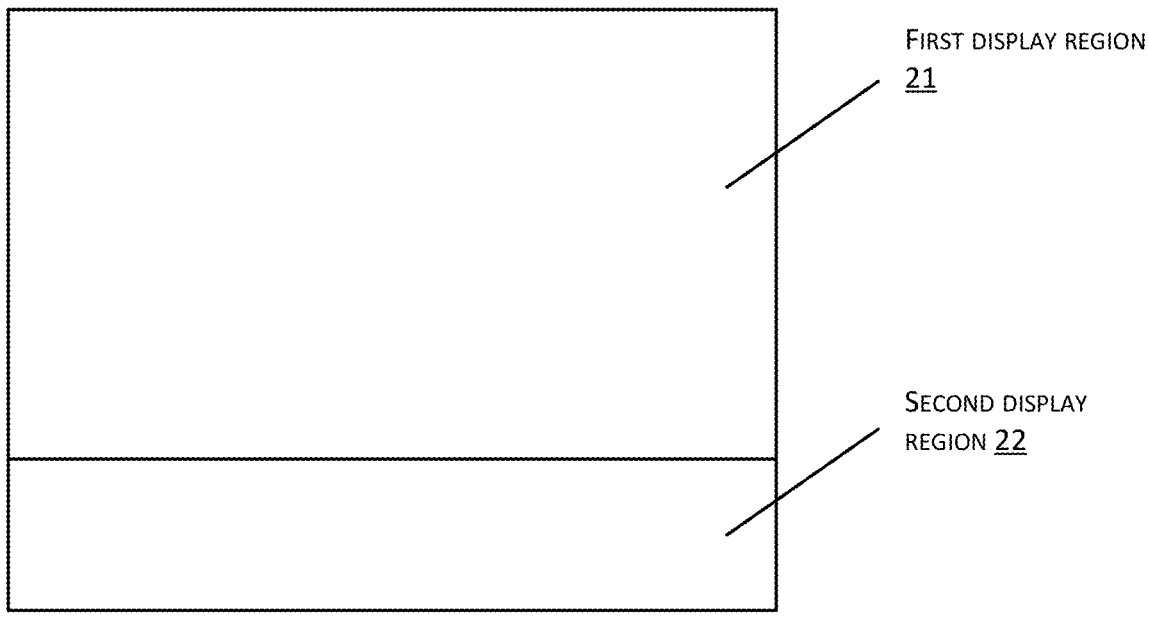
FIG. 2 shows a schematic diagram of a user interface of a first client in accordance with the embodiments of the present disclosure.

FIG. 2 shows a schematic diagram of a user interface of the first client. The user interface of the first client includes a first display region 21 and a second display region 22. The first display region of the first client is used for displaying a first business object. The second display region of the first client is used for instant communications between the first client and at least one second client. A user interface of the second client may also include a first display region and a second display region. The first display region of the second client is used for displaying a second business object. The second display region of the second client is used for instant communications between the second client and at least one first client. A schematic diagram of the user interface of the second client can also be like the one shown in FIG. 2.

Furthermore, the system shown in FIG. 1 may also include a server in a network. When a server is included, the communication connection may be established by the server, and the server can be used for relaying information. A method of transmitting a business object through relaying by a server is not described in detail in hereinafter. One skilled in the art can obtain the method of transmitting a business object in a situation that includes a server from the following description.

In implementation, WebSocket protocol is used for conducting transmission of information between the server and the first client, and between the server and the second client. The WebSocket protocol implements a full-duplex communication between a browser and a server. In this case, the server can initiatively transmit data to the first client and the second client, thereby implementing indirect communications between the first client and the second client via the server.

Apparently, other protocols may also be used for conducting transmission of information between the server and the first client, and between the server and the second client. The embodiments of the present disclosure employ WebSocket communication protocol because WebSocket is a relatively popular network protocol used in the Internet, and is easy to be implemented in different networks and clients.

The communication connection is used for connection of information transmission. Since a communication connection is established between the first client and the second client, information can be transmitted between the first client and any one second client of the at least one second client. When the number of second clients is greater than one, information can be transmitted between any two second clients of the at least two clients.

Moreover, in order to facilitate the description of examples in the following text, consistent definitions of users and clients are given herein.

A user U11, a user U12 and a user U13 use a first client A1, a first client A2 and a first client A3 respectively. A user U21, a user U22 and a user U23 use a second client B1, a second client B2 and a second client B3 respectively.

A method of transmitting business object(s) between a first client and a second client, a method of transmitting business object(s) between a first client and a plurality of second clients, and a method of transmitting business objects between a plurality of clients and a plurality of second clients are respectively described herein using a first embodiment, a second embodiment and a third embodiment.

First Embodiment

The first embodiment of the present disclosure describes a method of transmitting business object(s) between a first client and a second client.

Figure 3:
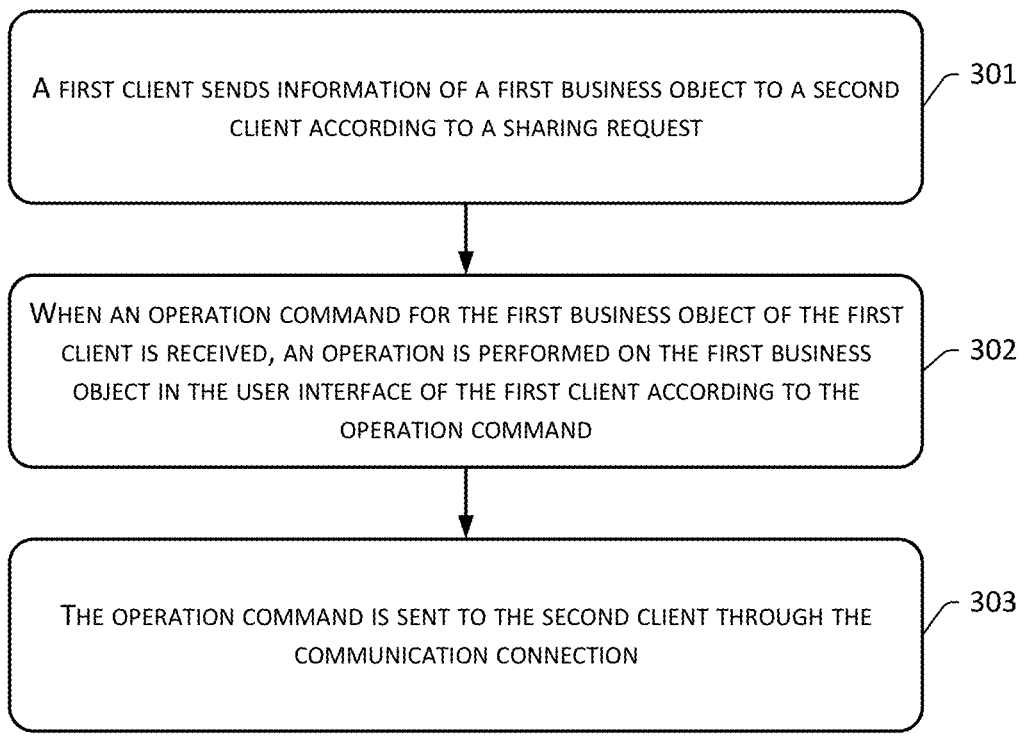
FIG. 3 shows a flowchart of a first method of transmitting a business object in accordance with the first embodiment of the present disclosure.

FIG. 3 shows a flowchart of a method of transmitting a business object in accordance with the first embodiment of the present disclosure. The method may include the following operations.

Operation 301: A first client sends information of a first business object to a second client according to a sharing request.

The first client is an active sharing party that initiates sharing, and the second client is a passive sharing party. The first client initiates a sharing request, requesting the second client to share with a first business object.

In implementations, the first client sends information of a first business object to the second client through the communication connection that has been established.

The first business object is a business object displayed in a first display region of the first client.

The information of the first business object can be an identifier of the first business object, and can also be a link of the first business object. If the information of the first business object is the identifier of the first business object, the second client can obtain the first business object based on the identifier of the first business object. For example, the first business object is obtained from a server storing identifiers of business objects and the business objects based on the identifier of the first business object. If the information of the first business object is the link of the first business object, the second client can obtain first business object based on the link of the first business object, and specifically can obtain from a network, or obtain from memory if the memory stores the first business object pointed by the link of the first business object.

In a process of using the first client A1 to browse description information of products, the user U11 may browse and find description information of a product of interest, and desire to immediately share the description information of the product of interest to the user U21 who is a buddy thereof, asking the user U21 for advice to determine whether to buy this product or not. In this case, the user U11 can use the first client A1 to send a sharing request to the second client B1.

In implementations, the first client A1 may, but is not limited to, use the following two approaches to implement sending information of a first business object to the second client B1 according to a sharing request.

A first approach includes the following operations.

Operation a11: The first client A1 sends a sharing request to the second client B1, the sharing request including an identifier of the first client A1 and an identifier of the second client B1.

The sharing request is used for sharing a first business object displayed in the first display region of the first client to the second client.

After receiving the sharing request, the second client B1 that is represented by the identifier of the second client B1 may send a sharing response to the first client. When a command of accepting the sharing request is received, a sharing response including information about an acceptance of sharing is sent to the first client A1 represented by the identifier of the first client A1. If a command of rejecting the sharing request is received, a sharing response including information about a rejection of sharing is sent to the first client A1 represented by the identifier of the first client A1.

Operation a12: The first client A1 receives a sharing response from the second client B1.

The sharing response includes information about an acceptance or a rejection of sharing.

If the second client B1 rejects to share the first business object of the first client A1, the second client B1 can send information about a rejection of sharing to the first client A1.

Operation a13: The first client A1 sends information of a first business object to the second client, in response to confirming that information about an acceptance of sharing is included in the received sharing response that is sent from the second client B1.

A second approach includes the following operations.

Operation b11: The first client A1 sends a sharing request to the second client B1, the sharing request including an identifier of the first client A1 and an identifier of the second client B1.

After receiving the sharing request, the second client B1 that is represented by the identifier of the second client accepts to perform information sharing by default, without the need of sending a sharing response to the first client A1, and is informed that the first client A1 is going to share a first business object of the first client.

Operation b12: The first client A1 sends information of a first business object to the second client B1.

In implementation, taking into account of the need of the first client to determine the second client prior to sending the sharing request to the second client, the approach further includes:

Operation c11: Contact information that is selected from a contact list of the first client is received.

The first client can be a client including an interface of a contact list (e.g., an instant communication client, a social networking business (SNS) client, etc.). As such, the user U11 can select a contact (the user U21) from the interface of the contact list of the first client A1. In this case, the first client A1 can receive information of the user U21, and set the second client B1 corresponding to the received information of the user U21 as the second client to be shared with the first business object.

Since a communication connection is established between the first client and the second client, a contact represented by the contact information is online.

Operation c12: A sharing request is sent to the second client corresponding to the selected contact information.

The selected contact information can correspond to the second client.

Figure 4:
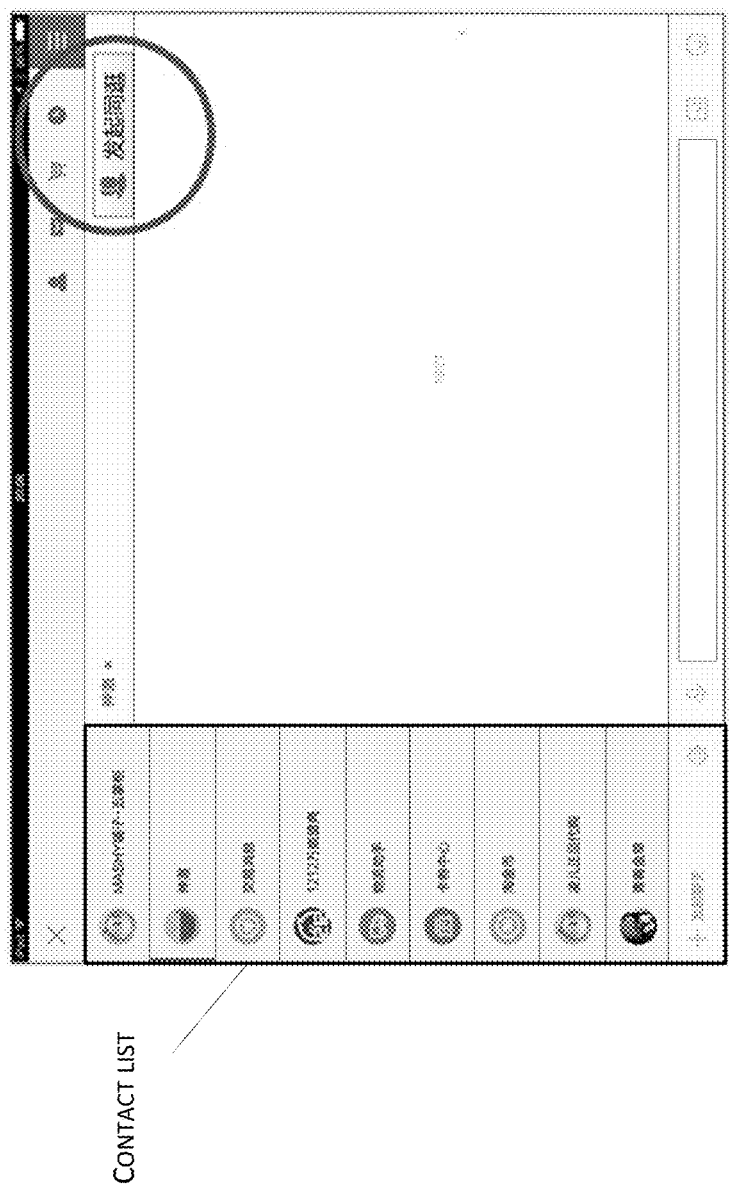
FIG. 4 shows a user interface of a first client A1 having a contact list in accordance with the first embodiment of the present disclosure.

In implementations, the interface of the contact list shown in FIG. 4 may include a sharing button (a button for initiating to walk together is shown in FIG. 4, and a function thereof is the same as the sharing button, for triggering a sending of a sharing request). The user U11 can trigger the first client A1 to send a sharing request to the second client B1 that corresponds to the selected contact information (the information of the user U21) by clicking on the sharing button.

Operation c13: The user interface is generated.

Figure 5:
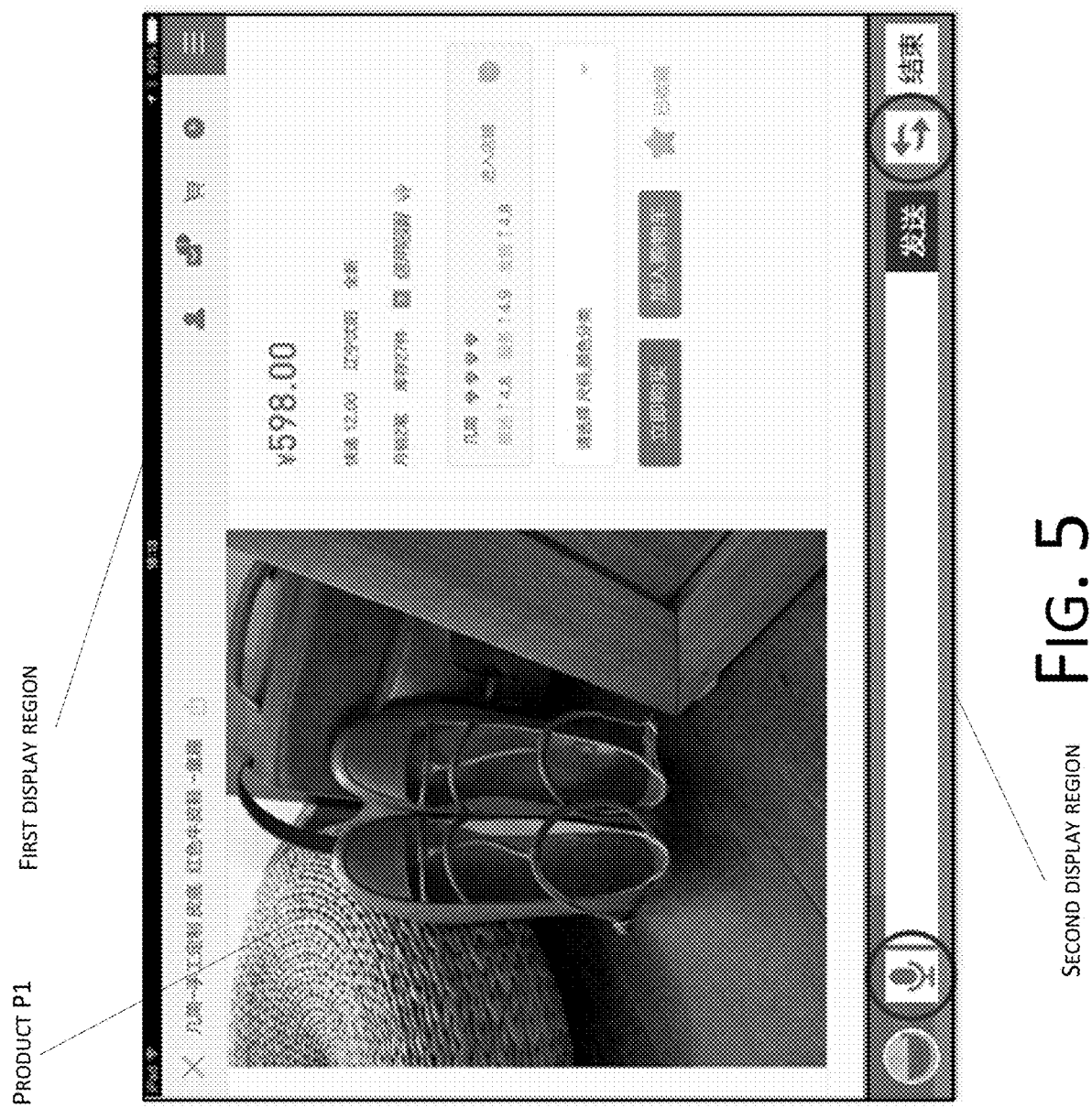
FIG. 5 shows a schematic diagram of a user interface of a first client A1 that presents description information of a product P1 in accordance with the first embodiment of the present disclosure.

At the operation c13, the interface having the contact information as shown in FIG. 4 jumps to the user interface including the first display region and the second display region, which is a user interface shown in FIG. 5.

A first display region in the user interface as shown in FIG. 5 displays description information of a product P1. The product P1 is acted as the first business object displayed in the first display region of the first client.

As can be seen from FIGS. 4 and 5, the first client in the embodiments of the present disclosure include functions of browsing a first business object and sharing the first business object to a second client, in addition to functions of a current instant communication client.

A goal of the operation 301 is to cause the second client to display the first business object in a user interface thereof.

In implementations, the user interface of the second client can also include a first display region and a second display region. The first display region of the second client is used for displaying a second business object. The second display region of the second client is used for instant communications between the first client and the second client.

Displaying the first business object in the user interface by the second client includes generating a first display sub-region and a second display sub-region from the first display region in the user interface by the second client; and displaying the first business object in the first display sub-region or the second display sub-region of the user interface by the second client.

In this case, if the second client B1 displays information of a product P2 (which acts as a second business object) in an interface of the first display region prior to receiving the sharing request from the first client A1, the second client B1 obtains description information of a product P1 from a link (an identifier) of the description information of the product P1 after receiving the link (identifier) of the description information of the product P1 from the first client A1. At this time, a schematic diagram of a user interface of the second client B1 is shown in FIG. 6.

Figure 6:
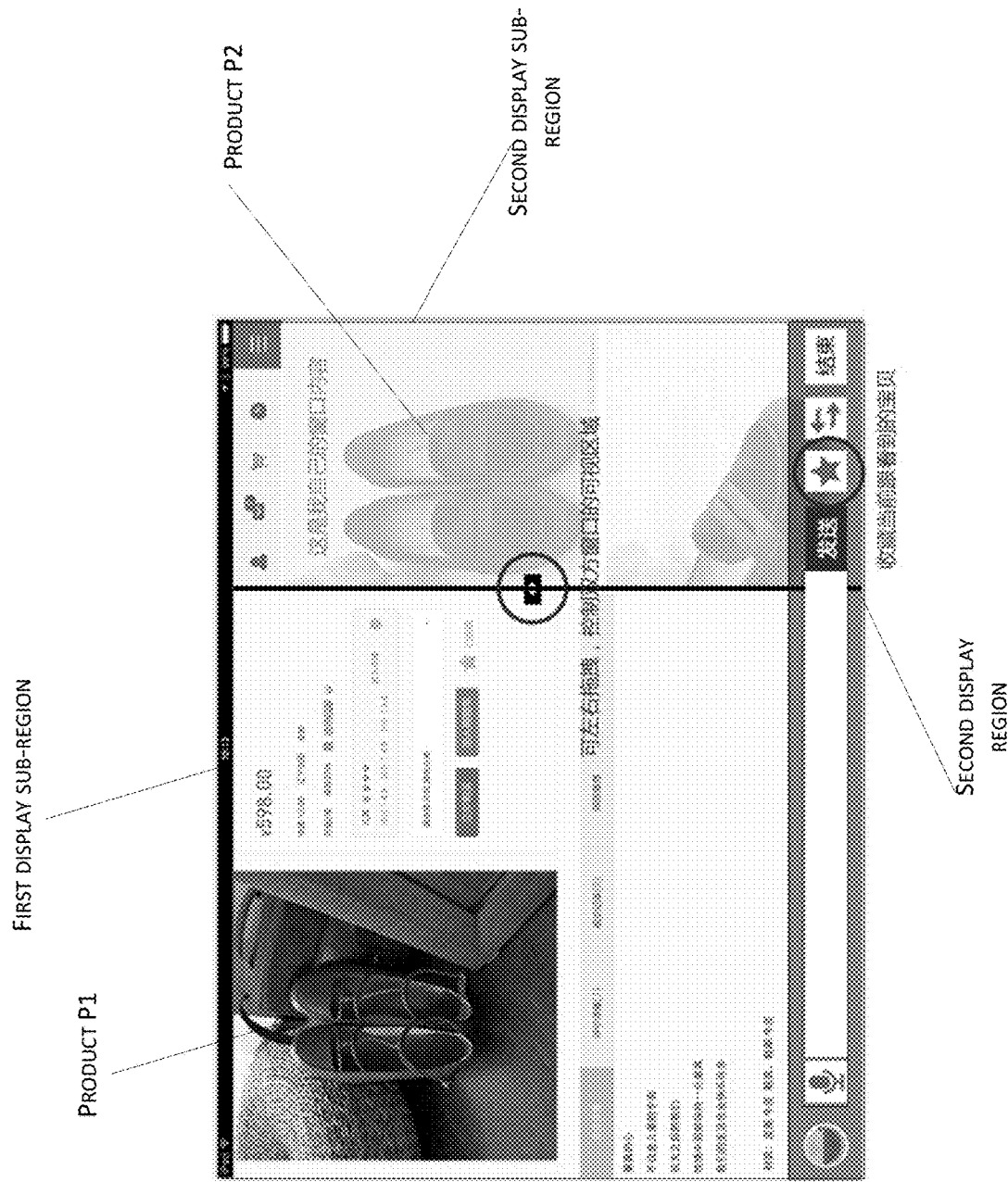
FIG. 6 shows a schematic diagram of a user interface of a second client B1 that presents description information of a product P1 and description information of a product P2 in accordance with the first embodiment of the present disclosure.

FIG. 6 shows the description information of the product P1 being displayed in the first display sub-region, and the description information of the product P2 being displayed in the second display sub-region. Apparently, the description information of the product P1 can be displayed in the second display sub-region, and the description information of the product P2 is displayed in the first display sub-region.

A control for controlling a viewable region as shown in FIG. 6 can also be included between the first display sub-region and the second display sub-region. Respective sizes of viewable areas of the first display sub-region and the second display sub-region can be controlled by moving the control for controlling a viewable region to the left or to the right.

If the second client B1 does not have any second business object displayed in the interface of the first display region prior to receiving the sharing request from the first client A1, the second client B1 obtains the description information of the product P1 from the link of the description information of the product P1 after receiving the link of the description information of the product P1 from the first client. The second client B1 does not need to generate a first display sub-region and a second display sub-region from the interface of the first display region, and can directly display the description information of the product P1 in the first display region. Alternatively, the second client B1 can first generate a first display sub-region and a second display sub-region from the first display region of the user interface thereof, and display the description information of the product P1 in the first display sub-region or the second display sub-region.

Figure 7:
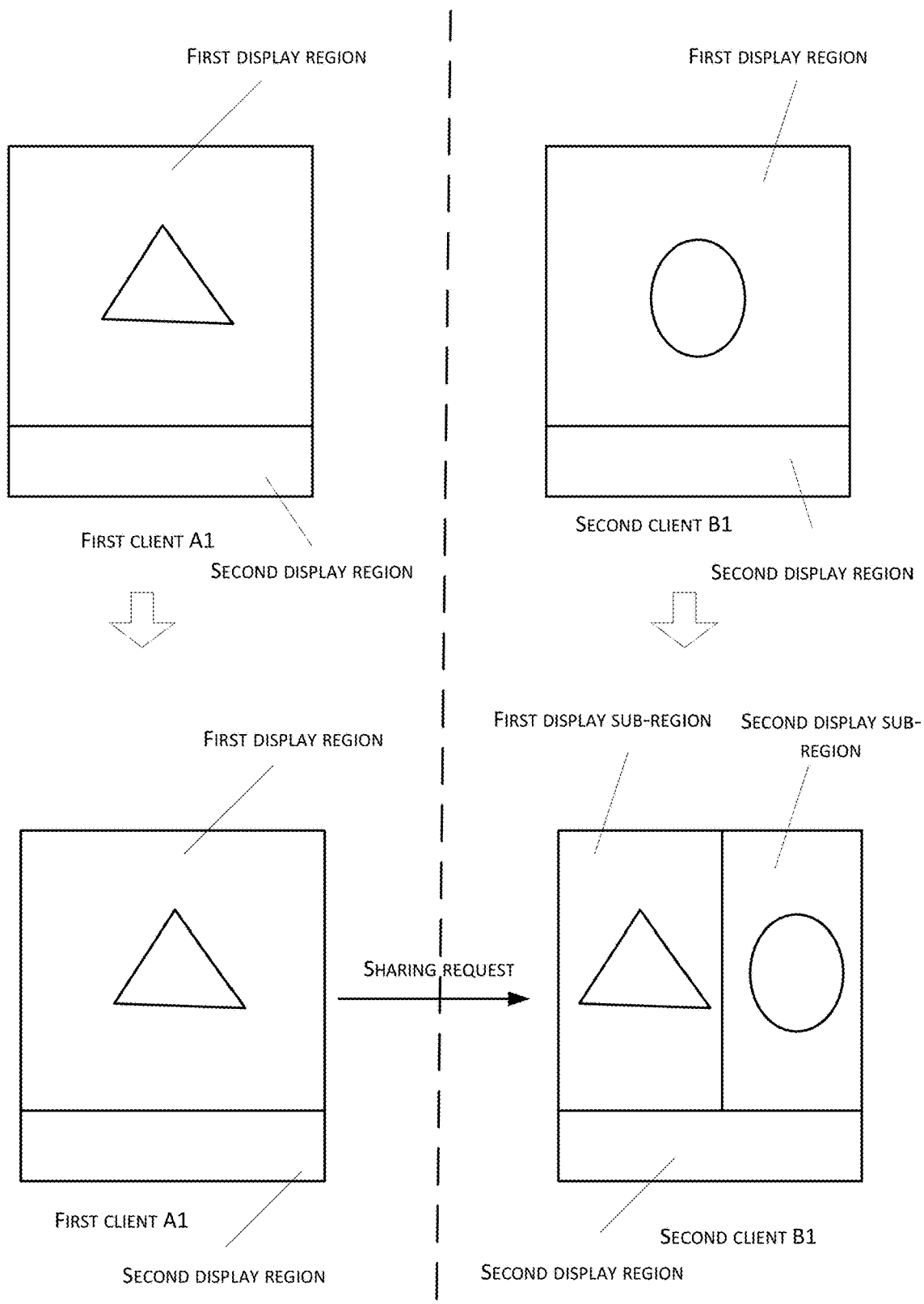
FIG. 7 shows a schematic diagram of user interfaces of a first client A1 and a second client B1 before and after a sharing request in accordance with the first embodiment of the present disclosure.

In order to intuitively and clearly see changes in the user interfaces of the first client A1 and the second client B1 before and after the sharing request, FIG. 7 shows user interfaces of the first client A1 before and after sending the sharing request, and user interfaces of the second client B1 before and after receiving the sharing request. FIG. 7 uses a triangle to represent the first business object of the first client A1, and a circle to represent the second business object of the second client B1.

Operation 302: When an operation command for the first business object of the first client is received, an operation is performed on the first business object in the user interface of the first client according to the operation command.

The operation command can be in different forms based on different input methods. For example, when the operation command is inputted via a pointing device, the operation command may be a single-clicking command, a double-clicking command, a dragging command, a selecting command, etc.

In the embodiments of the present disclosure, taking into account that screens of current mobile smart terminals are generally touch screens and the mobile smart terminals are hardware devices that can be used to fulfill the needs of sharing first business objects anywhere at any time, the operation command is in implementation inputted via a touch screen, which includes at least one of a sliding command, a zoom-in command, a zoom-out command, a dragging command, and a selecting command. The sliding command can be implemented by a sliding operation, which includes a left/right sliding command, an up/down interactive command. The zoom-in command can be implemented by a separation operation or a clicking (a magnifying button). The zoom-out operation can be implemented by a gathering and closing operation or a clicking (a shrinking button). The dragging command can be implemented by a dragging operation.

The user interface as shown in FIG. 5 is used as an example. If the user U11 clicks a magnifying button included in a product image (a type of description information of the product P1) displayed in the user interface of the first client A1, the first client A1 can magnify the product image in the user interface of the first client A1 after receiving a magnifying command for the product image at operation 302.

Operation 303: The operation command is sent to the second client through the communication connection.

An operation command for a first business object of the first client is sent to the second client each time when the operation command is received. In order to save data flow, multiple operation commands and information of execution time points of the operation commands may also be sent to the second client according to a frequency of receiving the operation commands. For example, a time point of a current operation command that is received is determined first, and a defined time period is waited to pass. Operation command(s) within the defined time period and information of an execution time point of each operation command is/are sent to the second client.

If the first client A1 receives a magnifying command for the product image at operation 302, the first client A1 sends the magnifying command for the product image to the second client B1 at operation 303.

The purpose of sending the operation command to the second client at operation 303 is to cause the second client to perform the operation on the first business object on the user interface of the second client according to the operation command.

It should be noted that, at operation 302 and operation 303, when an operation command for a first business object of the first client is received, an associated operation is first performed on the user interface of the first client according to the operation command, and operation 303 is then performed. Apparently, when an operation command for the first business object of the first client is received, operation 303 may be performed first, and the operation on the first business object may then be performed in the user interface of the first client to the operation command. Alternatively, the operation on the first business object in the user interface of the first client and operation 303 may also be performed at the same time according to the operation command. The present disclosure does not have any limitations thereon.

The foregoing operations 301 to 303 implement browsing a first business object of a first client and browsing a change in the first business object caused by an operation of the first client on the first business object synchronously by a first client and a second client. The first client and the second client each have a second display region for instant communications, thus making it possible for the same first client or the same second client to provide comments while browsing the first business object. Furthermore, since the operation command of the first client for the first business object is sent to the second client, the second client also performs the operation on the first business object, so that comments matching business operations of the first object can be provided, to achieve a face-to-face sharing effect between the first client and the second client, and to ensure an efficient sharing of the first business object.

The beneficial effects of the solutions about transmitting a business object between a first client and a second client are described herein using specific application scenarios.

First application scenario: The user U21 is inconvenient to obtain a first business object and performs an operation on the first business object through the second client B1 in a certain situation, for example, being in a moving state, and not knowing details of the first business object. The user U21 may then ask the user U11 to help him/her to find the first business object instead and share the first business object with the second client B1 using other communication methods such as telephone and instant communications. In this case, the first client A1 may find the first business object and share the first business object to the second client B1. Subsequently, the user U11 may input an operation command for the first business object. The first client A1 performs the operation command, and transmits the operation command to the second client B1. The second client B1 also performs the operation command in turn. In this case, the user U21 can browse the first business object and a change in the first business object caused by the operation command without inputting the operation command object.

Second application scenario: The user U11 needs the user U21 to explain a first business object, and such explanation needs a certain operation to be performed on the first business object in addition to certain changes caused by the operation on the first business object. The user U11 may input an operation command for the first business object in the first client A1. The first client A1 performs the operation command, and transmits the operation command to the second client B1. The second client B1 performs the operation command. In this case, the user U21 can synchronously view the first client A1 browsing the shared first business object and the changes caused by the operation command, so as to intuitively know what the user U11 does not understand and know, and then provide explanations to the user U11 in a targeted manner, thus making communications more effective and convenient.

Third application scenario: The user U11 is visiting a certain shopping website and is interested in description information of a product P1 viewed thereby, and needs to share it with his/her friend user U21, so as to browse the product, perform operations on the description information of the product (such as enlarging or reducing the size of an image of the product) and provide comments on the product synchronously with the user U21. The user U11 may input an operation command for the description information of the product P1 in the first client A1, and the first client A1 performs the operation command, and transmits the operation command to the second client B1. The second client B1 also performs the operation command. At this time, the user U21 can see the description information of the shared product P1 and changes in the description information of the product P1 caused by the operation command of the first client A1, thus intuitively knowing that the first client A1 is interested in the current product and gives comments thereon. This successfully simulates an effect of visiting a same shopping website in person together in reality, thus making communications more effective and convenient.

Taking into account of the need of sending instant communication messages while sharing a first business object, in order to help the user of the second client to know about comments of the user of the first client on the first business object, the second display region in implementation includes an instant communication message input sub-region. The method further includes receiving an instant communication message inputted in an instant communication message input sub-region, and sending the instant communication message to the second client, to cause the second client to display the instant communication message on the user interface thereof.

In addition, the first client may also need to know comments of the second client on the first business object, and communicate with each second client. In implementation, the second display region may further include an instant communication message display a sub-region. The method further includes receiving an instant communication message sent by the second client, and displaying the instant communication message sent by the second client in the instant communication instant message display sub-region or the first display region of the first client.

The instant communication message may be a voice message, a text message, an emoji message, a picture message, animation, video, and the like.

Figure 8:
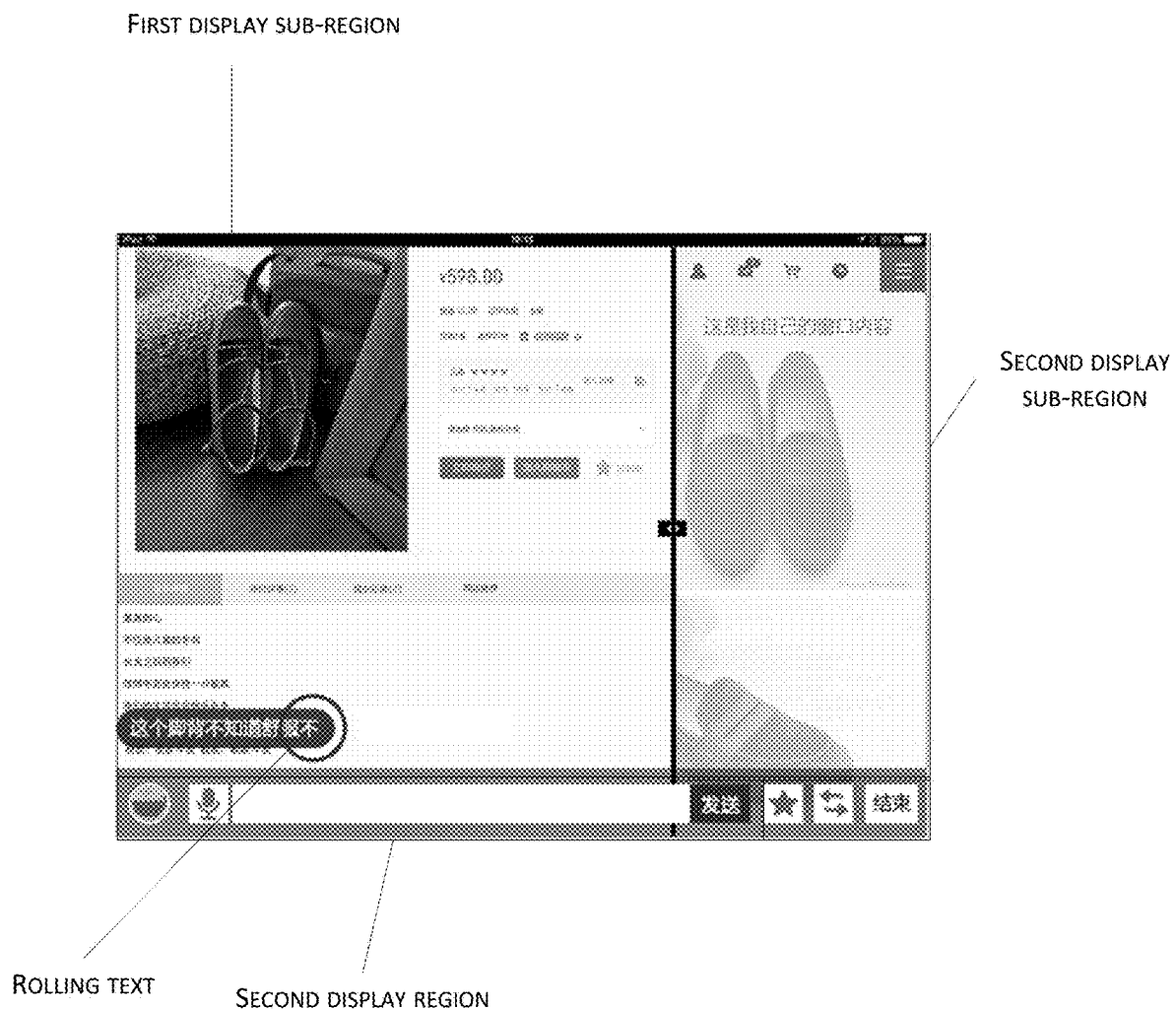
FIG. 8 shows a schematic diagram of a user interface displaying instant communication messages in a first display sub-region using a scrolling caption approach in accordance with the first embodiment of the present disclosure.

In addition, in the foregoing solutions about transmitting a business object, the first/second client may display a received instant communication message in the instant communication message display sub-region. A variety of different display methods exist, e.g., a common way of displaying an instant communication message such as a dialogue in a form of one-to-one chat or group chat, etc. Alternatively, presentation may be made in a form of a rolling text in the first display region of the first client, or the first display sub-region (or the second display sub-region) of the second client. As shown in FIG. 8, "not knowing whether this instep feels comfortable or not" displayed in the first display sub-region as shown in FIG. 8 is a rolling text. A display form of a rolling text can also be configured, such as a fade-in fade-out form. Displaying in the form of a rolling text has advantages. On the one hand, since the rolling text moves continuously in the first display region, the first display sub-region or the second display sub-region on the one hand, no impact is made on displaying the first business object or the second business object. On the other hand, displaying received instant communication messages in the form of the rolling text not only saves the space of the interface occupied by the instant communication messages, but also provides a wider first display region for displaying the first business object. Furthermore, the display space of the instant communication messages is enlarged, and the readability and interestingness of the instant communication messages are enhanced. This is especially true when displaying instant communication messages and first business objects simultaneously using electronic devices having relatively small screens.

In addition, considering network conditions and different requirements for timeliness of transmission of information, the first client and the second client may include two connections of different time lags, one of which has relatively poor timeliness and lower accuracy, and the other has better timeliness and higher accuracy. Alternatively, only one type of communication connection may be included. In implementation, the communication connection in the solutions of the embodiments of the present disclosure is divided into two situations.

First case: The communication connection includes a sharing connection and an instant communication connection.

The sharing connection is a connection having relatively good timeliness and relatively high accuracy for implement transmission of business objects, and the instant communication connection is a connection with relatively poor timeliness and relatively low accuracy for implementing the transmission of the business objects.

Relatively stringent requirements for timeliness and accuracy of information transmission for implementing synchronous browsing of first business objects are taken into consideration. For example, when a first business object is to be closed within a limited time (for example, a promotion period of a product is close to an end, the inventory of product is less than a set value, the products are hot or sales products), in order to ensure that information of the first business object is accurately transmitted to the second client in a relatively short period of time and thus the second client obtains and displays the first business object in time, the information of the second business object can be transmitted through the shared connection. The sharing connection is a dedicated connection. Furthermore, in this case, in order to obtain an operation command of the first client for the first business object quickly and ensure the operation command is performed on the first business object of the second client timely and accurately, so that the second client can know related features of the first business object in time, the operation command may be transmitted through the sharing connection. In general, instant communication messages have a low requirement of timeliness for the transmission of the business objects, and the instant communication connection may be used for transmission of the instant communication messages. However, when a first business object has a less stringent requirement on the timeliness of transmission, the instant communication connection may also be used for transmitting information of the first business object. This allows communication connections to match information have different requirements of timeliness and accuracies, and achieve the effects of maximizing the utilization of transmission resources.

It should be noted that, if information of a first business object and an operation command are transmitted using the sharing connection, instant communication messages are transmitted through the communication connection. In this case, at operation 301, the first client sends the information of the first business object displayed in the first display region to the second client through the sharing connection according to the sharing request. Operation 303 specifically includes sending the operation command to the second client through the sharing connection If the sharing connection is used in the transmission of the information of the first business object, the operation command and the instant communication messages are transmitted using the instant communication connection. If the sharing connection is used in the transmission of the operation command, the instant communication connection is used in the transmission of the information of the first business object and the instant communication messages.

In addition, when the established communication connections include a sharing connection and an instant communication connection, the design of the first client and the second client may also be simplified. Different types of messages (the first business object and/or information of the operation command may be referred to as a sharing message) are transmitted via different communication connections. As such, the first client and the second client do not need to determine a type of a message anymore, and directly apply a message received from the sharing connection to a respective first display region to implement sharing of a first business object and an operation on the first business object, and directly apply a message received from the instant communication connection to the second display region to implement instant communications.

Second case: The communication connection is an instant communication connection.

The instant communications connection is used for transmitting information of the first business object, the operation command, and the instant communication message.

Furthermore, the communication connection may be a communication connection directly established from the first client to the second client. For example, a communication connection may be established directly between the first client and the second client in a local area network, without the need of using a server. Alternatively, the communication connection may also be a communication connection from a first client to a second client established by a server.

In implementation, the communication connection is a communication connection between a first client and a second client established by a server. The information of the first business object is an identifier of the first business object.

Sending the information of the first business object to the second client through the communication connection includes sending the identifier of the first business object to the server, to enable the server to obtain a link of the first business object corresponding to the identifier of the first business object from stored correspondence relationships between identifier of business objects and links of the business objects, and send the obtained link of the first business object to the second client.

Each first business object has an identifier, and the identifier of each business object corresponds to a link of the first business object. The first business object can be obtained through the link of the first business object. The server herein has the capabilities of establishing communication connections and converting identifiers business objects to links of the business objects.

Since the link of the first business object usually has a larger amount than that of the identifier of the first business object, the identifier of the first business object sent herein is not the link of the first business object, which in turn, saves the flow of information that is needed in sending the first business object.

Using the foregoing solutions, the second client successfully shares the first business object of the first client. Therefore, the first business object of the first client is displayed in the user interface of the second client. In this case, the first business object displayed in the user interface of the second client displays may be referred to as a first business object of the second client.

Based on the above solutions, an exemplary solution is described hereinafter.

First Exemplary Solution

Generally, the first client can perform an operation on a first business object on the user interface thereof, and the second client may perform an operation on a second business object on the user interface thereof. In the solutions of the embodiments of the present disclosure, in order to strengthen the efficiency of communications, after the second client shares the first business object of the first client, the second client may perform an operation on the first business object in the user interface of the second client according to the operation command based on an operation permission or a default permission set by the first client (which may be specific to the first business object), in response to receiving the operation command for the first business object of the second client.

For example, if the operation permission (default) set by the first client A1 for the first business object is set to allow the second client B1 to operate on the first business object, the second client B1 may perform the operation command on the first business object. Otherwise, the second client B1 cannot perform the operation command on the first business object;

In order to enable the first client to synchronously browse changes caused by an operation of the second client on the first business object to enhance the efficiency of communications, when the second client performs an operation command in the first business object displayed on the user interface thereof, the second client may also perform the operation on the first business object in the user interface thereof according to the operation command in response to receiving the operation command of the second client for the first business object, and send the operation command to the first client. Upon receiving the operation command sent by the second client with respect to the first business object of the second client, the first client performs an operation on the first business object in the user interface of the first client according to the operation command.

When the first client A1 shares the first business object to the second client B1, the beneficial effects of the first exemplary solution is described hereinafter using the following two scenarios as examples.

First scenario: In some situations, it is inconvenient for the user U11 to perform an operation on a first business object through the first client A1, for example, being in a moving state. In this case, the user U11 may notify the user U21 to input an operation command for the first business object in the second client B1. The second client B1 performs the operation command, and transmits the operation command to the first client A1. The first client A1 performs the operation command, and at this time, the user U11 can browse the shared first business object and a change made to the first business object that is caused by the operation command without inputting the operation command.

Second application scenario: The user U11 needs the user U21 to provide an explanation of a first business object. The explanation needs to be performed in conjunction with changes in the first business object. The user U21 may then input an operation command for the first business object in the second client B1. The second client B1 performs the operation command and transmits the operation command to the first client A1. The first client A1 performs the operation command. At this time, the user U11 can the changes made to the shared first business object that are caused by the operation command to understand the explanation in a better manner, leading to more effective and convenient communications.

Second Exemplary Solution

Figure 9:
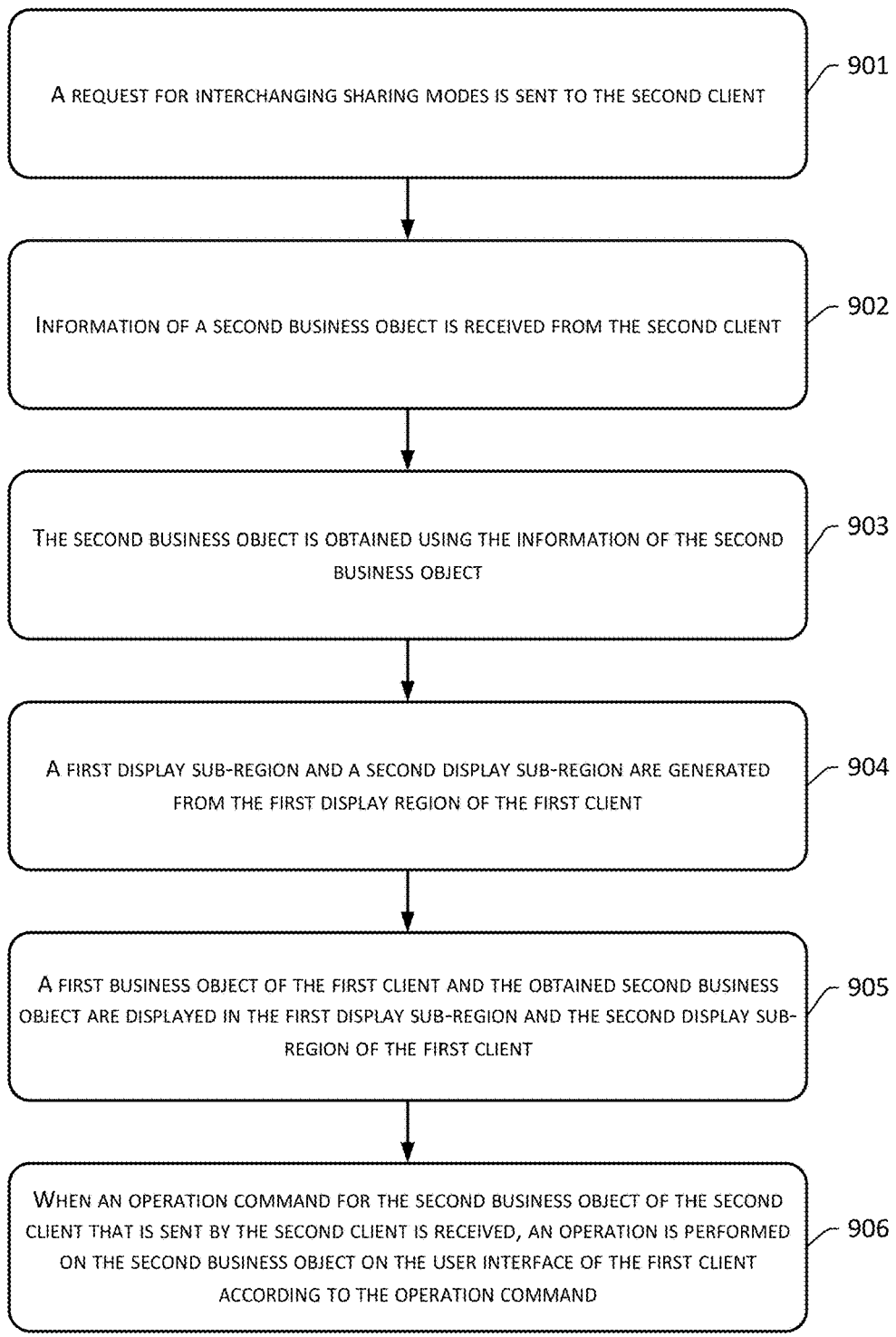
FIG. 9 shows a flowchart of a second method of transmitting a business object in accordance with the first embodiment of the present disclosure.

Furthermore, taking into account that the second business object currently browsed by the user U21 in the second client B1 may also need to be shared to facilitate mutual sharing of business objects that are of interest with each other after the user U11 shares the first business object to the user U21 In this case, the user U11 may send a request to the user U21 through an instant communication message, asking the user U11 to initiate a sharing request to the first client A1 using the second client B1, to implement sharing of the second business object. In implementation, in order to facilitate the first client A1 to actively initiate sharing of a second business object of the second client B1 and efficiently conduct sharing of business objects that are of interest, the above business transmission method further includes the following operations, a flowchart 900 is shown in FIG. 9:

Operation 901: A request for interchanging sharing modes is sent to the second client.

The request for interchanging the sharing modes includes an identifier of the first client and an identifier of the second client, used for changing the first client from an active sharing party to a passive sharing party, and the second client from the passive sharing party to the active sharing party. In other words, the first client requests to share the second business object of the second client.

In this case, after receiving the request for interchanging the sharing modes, the second client may send a sharing mode interchanging response which includes information about an acceptance of interchanging the sharing modes to the first client, and then send information of the second business object to the first client. Alternatively, the sharing mode interchanging response may not be sent to the first client, and accept the interchange by default, sending the information of the second business object of the second client directly to the first client.

Since the sharing modes are interchanged, the second client may no longer display the first business object of the first client on the user interface thereof. Apparently, when the second client rejects to interchange the modes, the first client may further send a sharing mode interchanging response containing information about a rejection of the interchange to the first client. In this case, the first client does not perform the following operations 902-905.

Operation 902: Information of a second business object is received from the second client.

The information of the second business object is similar to the information of the first business object at operation 301, and details thereof are not repeatedly described herein.

A purpose of operation 902 of receiving the information of the second business object is to obtain the second business object using the information of the second business object.

Operation 903: The second business object is obtained using the information of the second business object.

A method used by the first client to obtain the second business object using the information of the second business object is the same as the foregoing method used by the second client to obtain the first business object using the identifier of the first business object at operation 301, and is not repeatedly described.

Operation 904: A first display sub-region and a second display sub-region are generated from the first display region of the first client.

Two display sub-regions are generated in the first display region for the purpose of displaying the first business object of the first client and the obtained second business object.

The two display sub-regions may be a horizontal bar structure or a vertical bar structure (as shown in FIG. 8), which is not limited in the present disclosure.

Operation 905: The first business object of the first client and the obtained second business object are displayed in the first display sub-region and the second display sub-region of the first client.

The first business object may be displayed in one of the two display sub-regions, and the second business object may be displayed in the remaining one of the display sub-regions.

The second business object that comes from the second client and/or the first business object of the first client displayed in each display sub-region may be labeled, to help distinguishing between the first business object and the second business object.

Figure 10:
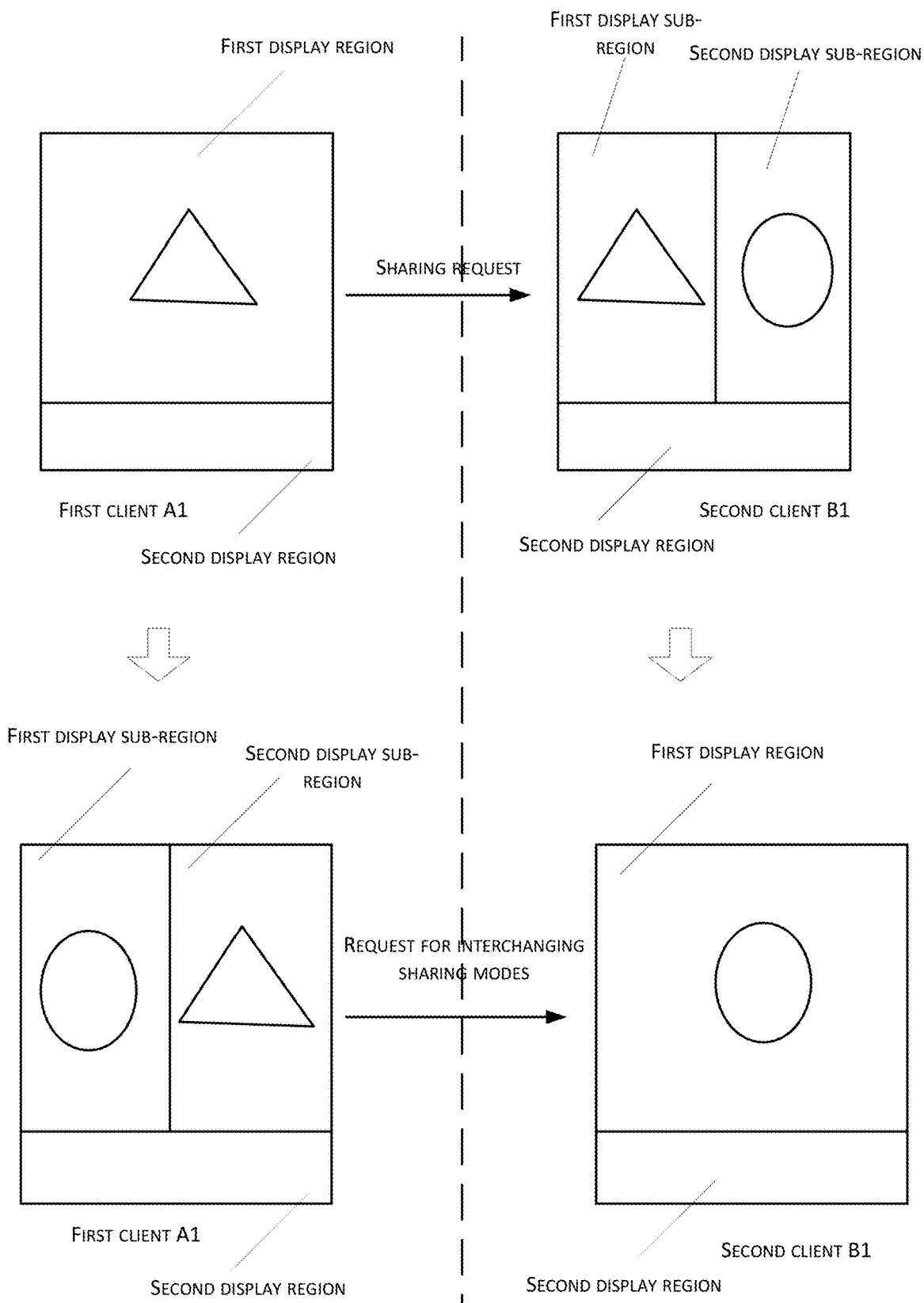
FIG. 10 shows a schematic diagram of user interfaces of a first client A1 and a second client B1 before and after a request for interchanging sharing modes in accordance with the first embodiment of the present disclosure.

At this time, the user interface of the first client A1 and the user interface of the second client B1 in FIG. 7 may be changed to ones shown in FIG. 10. In FIG. 10, the first business object of the first client A1 is still represented by a triangle, and the second business object of the second client B1 is represented by a circle.

Operation 906: When an operation command for the second business object of the second client that is sent by the second client is received, an operation is performed on the second business object on the user interface of the first client according to the operation command.

In the above exemplary solution, the first client achieves sharing of a second business object of the second client to the first client by sending a request for interchanging sharing modes to the second client, and performs an operation on the second business object according to an operation command after receiving the operation command for second business object from the second client, such that the first client can see changes caused by operations of the second client on the second business object of the second client synchronously. This thus achieves mutual sharing of first client and the second client about respective business objects and changes caused by operations on the business objects with each other. As such, transmission of information between the first client and the second client is more convenient and effective.

Third Exemplary Solution

In order to enhance the efficiency of communication, after the foregoing second exemplary solution is performed, the first client can enjoy the sharing of the second business object of the second client. The first client may perform an operation performed on the second business object in the user interface of the first client according to an operation command based on an operation permission or a default permission set by the second client (which may be specific to the second business object) when receiving the operation command for the second business object of the first client.

For example, if the operation permission (default) set by the second client B1 for the second business object is set to allow the first client A1 to operate on the second business object, the first client A1 may perform an operation command on the second business object. Otherwise, the first client A1 cannot perform an operation command on the second business object.

Furthermore, in order to enable the second client to browse changes caused by operations of the first client on the second business object synchronously and to further enhance the efficiency of communications, the above method of transmitting the business object in implementation further includes performing an operation on the second business object in the user interface of the first client according to an operation command when receiving the operation command for the second business object of the first client; and sending the operation command to the second client, to cause the second client to perform an operation on the second business object in the user interface thereof according to the operation command.

The beneficial effects brought by the foregoing third exemplary solution are similar to those obtained by the first exemplary solution, and may be considered as changing the roles between the first client and the second client in the second exemplary solution. Details thereof are not repeatedly described herein.

The foregoing solution describes that the first client sends a sharing request to the second client and sends a request for interchanging sharing modes to the second client. Apparently, the second client may also send a sharing request and a request for interchanging the sharing modes to the first client. However, since the roles of the second client and the first client are essentially the same after the roles are exchanged, the details thereof are not repeatedly described herein.

The solutions for transmitting a business object between a first client and a second client are described above from the perspective of the first client. The solutions for transmitting a business object between a first client and a second client are described hereinafter from the perspective of the second client. Due to correspondence therebetween, details of related implementations can be referenced to the description of the solutions for transmitting the business object from the perspective of the first client, and details thereof are not repeatedly described herein.

Figure 11:
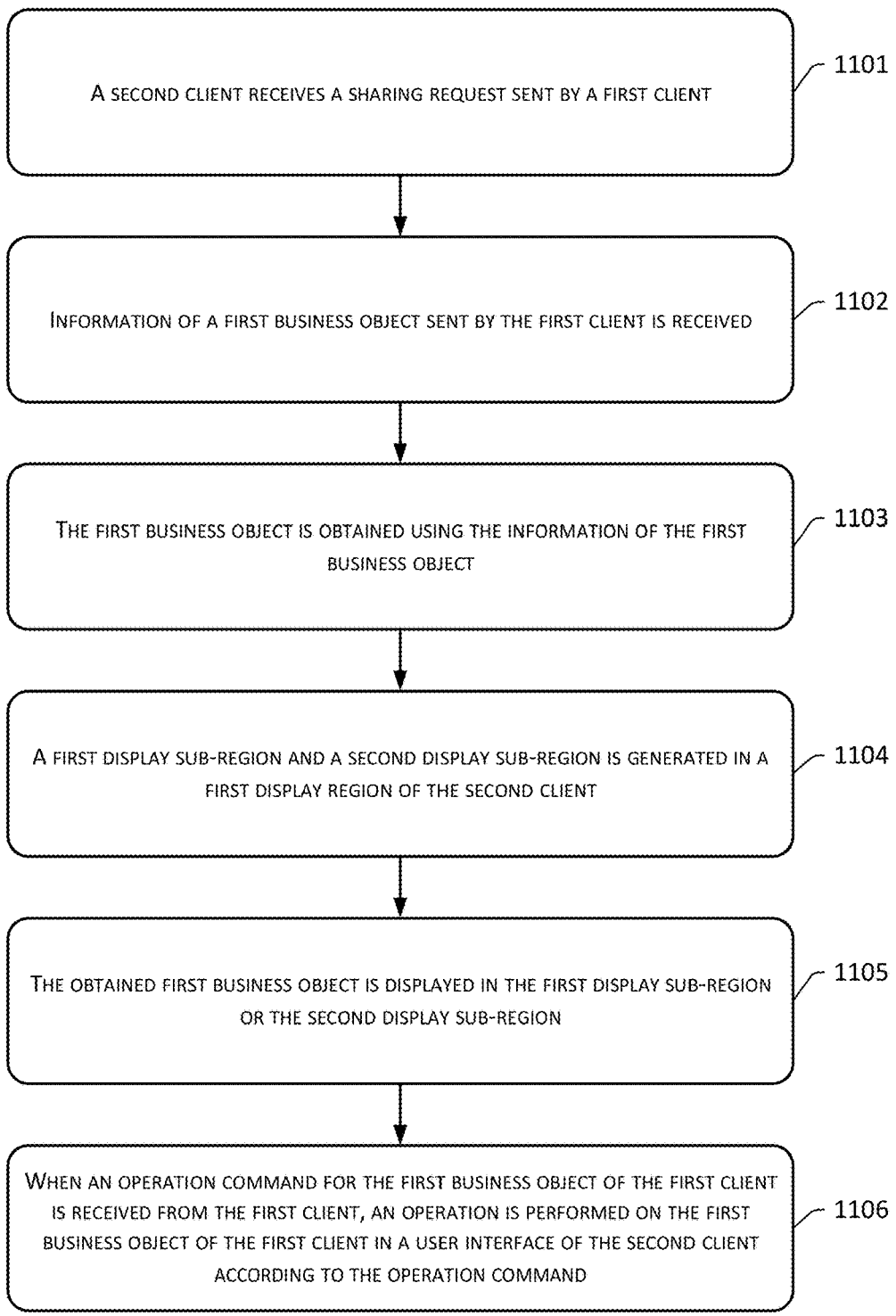
FIG. 11 shows a flowchart of a third method of transmitting a business object in accordance with the first embodiment of the present disclosure.

FIG. 11 is a schematic diagram of a method 3 for transmitting a business object between a first client and a second client with the second client as an execution body, and includes the following operations.

Operation 1101: A second client receives a sharing request sent by a first client.

Operation 1102: Information of a first business object sent by the first client is received.

Operation 1103: The first business object is obtained using the information of the first business object.

Operation 1104: A first display sub-region and a second display sub-region is generated in a first display region of the second client.

The above operations 1103 and 1104 may be executed in parallel, or operation 1104 may be performed first, and then operation 1103 is performed, which is not limited herein.

Operation 1105: The obtained first business object is displayed in the first display sub-region or the second display sub-region.

Operation 1106: When an operation command for the first business object of the first client is received from the first client, an operation is performed on the first business object of the first client in a user interface of the second client according to the operation command.

In implementation, the second display region includes an instant communication message display sub-region, and the method further includes receiving and displaying an instant communication message sent by the first client, wherein the instant communication message is displayed in at least one of the instant communication message display sub-region, the first display sub-region, or the second display sub-region of the second client.

In implementation, the second display region further includes an instant communication message input sub-region, and the method further includes receiving an instant communication message inputted in the instant communication input sub-region, and sending the instant communication message to the first client, to cause the first client to display the inputted instant communication message entered in a user interface thereof.

In implementation, the method further includes performing an operation on the first business object in the user interface of the second client according to an operation command when receiving the operation command for the first business object of the second client; and sending the operation command to the first client, to cause the first client to perform an operation on the first business object in the user interface thereof according to the operation command.

In implementation, the method further includes receiving a request for interchanging sharing modes from the first client; sending information of a second business object to the first client, so that the first client displays the second business object in the user interface thereof; performing an operation on the second business object in the user interface of the second client according to an operation command when the operation command for the second business object of the second client is received; and sending the operation command to the first client to cause the first client to perform an operation of the second business object in the user interface thereof according to the operation command.

In implementation, the method further includes performing an operation on the second business object on the user interface of the second client in response to receiving an operation command for the second business object of the first client from the first client.

Second Embodiment

The second embodiment of the present disclosure describes a method for transmitting a business object between a first client and a plurality of second clients.

Figure 12:
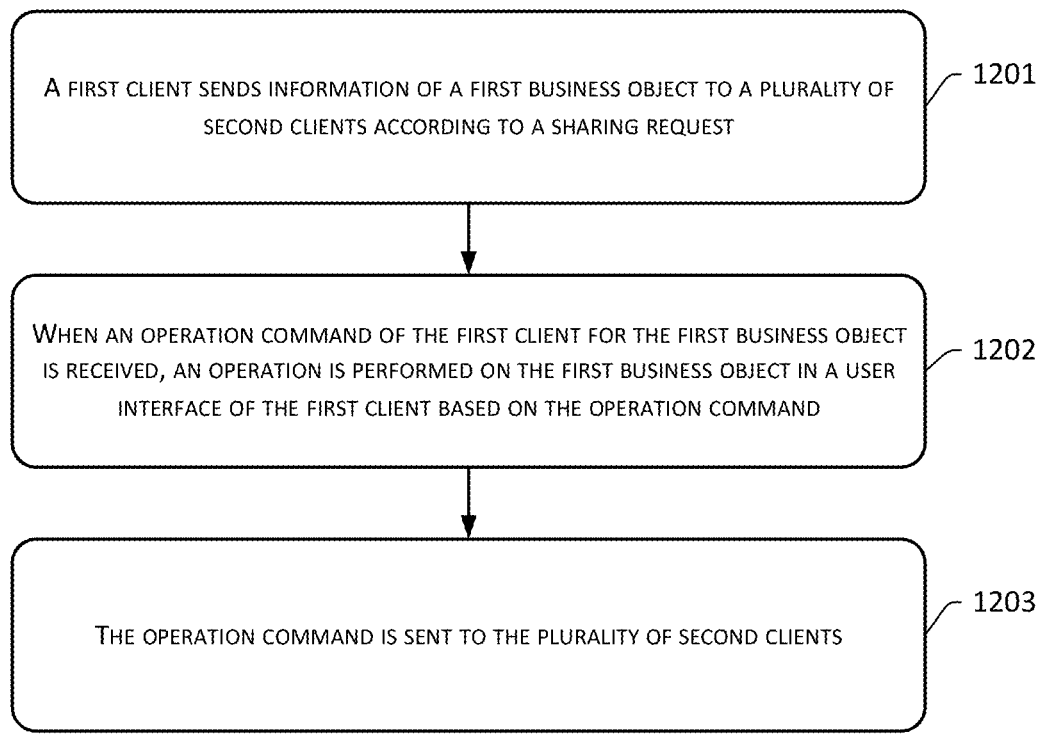
FIG. 12 shows a flowchart of a first method of transmitting a business object in accordance with the second embodiment of the present disclosure.

FIG. 12 shows a flowchart of a business object transmission method provided by the second embodiment of the present disclosure, and includes the following operations.

Operation 1201: A first client sends information of a first business object to a plurality of second clients according to a sharing request.

In the second embodiment, a first client and at least two second clients establish a communication connections with each other.

The plurality of clients in the foregoing operation 1201 are some or all of second clients among the at least two second clients.

When the first client A1 is used for browsing description information of products, the user U11 may browse description information of a product that is of interest, and hope to share the description information of the product of interest to other online buddies—the user U21, the user U22 and the user U23, allowing the user U21, the user U22 and the user U23 for help and advices, in order to decide whether to purchase the product or not. In this case, the user U11 can use the first client A1 to send a sharing request to the second client B1, and the second client B2, and the second client B3 at the same time.

In this case, the first client A1 serves as an active sharing party, the second client B1, the second client B2, and the second client B3 serve as passive sharing parties. The second client B1, the second client B2, and the second client B3 share the description information of the product of interest that is browsed in the first client A1.

Specifically, the first client A1 may, but is not limited to, implement the following two approaches for sending the information of the first business object displayed in a first display region to the plurality of second clients according to the sharing request through the communication connections.

A first approaches includes the following operations.

Operation a21: The first client A1 send a sharing request to the second client B1, the second client B2 and the second client B3.

The sharing request is used for sharing the first business object displayed in the first display region of the first client A1 to the second client B1, the second client B2, and the second client B3.

At operation a21, when communication connections between the first client A1, and the second client B1, the second client B2 and the second client B3 are established through a server, the sharing request may include an identifier of the first client, an identifier of the second client B1, an identifier of the second client B2, and an identifier of the second client B3. Sending sends the sharing request to the second client B1, the second client B2, and the second client B3 by the first client A1 may include sending the sharing request to the server by the first client A1; and separately sending the sharing request to the second client B1, the second client B2, and the second client B3 by the server. Alternatively, the server processes the sharing request to obtain three processed sharing requests, which respectively are a sharing request including the identifier of the first client A1 and the identifier of the second client B1, and a sharing request including the identifier of the first client A1 and the identifier of the second client B2, and a sharing request including the identifier of the first client A1 and the identifier of the second client B3. The sharing request including the identifier of the first client A1 and the identifier of the second client B1 is sent to the second client B1, the sharing request including the identifier of the first client A1 and the identifier of the second client B2 is sent to the second client B2, and the sharing request including the identifier of the first client A1 and the second client B3 is sent to the second client B3.

When the first client A1 directly establishes communication connections with the second client B1, the second client B2 and the second client B3, the sharing request may include the identifier of the first client A1, the identifier of the terminal B1, the identifier of the second client B2, and the identifier of the second client B3. The first client A1 separately sends the sharing request to the second client B1, the second client B2, and the second client. Alternatively, the first client A1 creates sharing requests for the second client B1, the second client B2 and the second client B3 individually, which may include a sharing request created for the second client B1 and including the identifier of the first client A1 and the identifier of the second client B1, a sharing request created for the second client B2 and including the identifier of the first client A1 and the identifier of the second client B2, and a sharing request created for the second client B3 and including identifier of the first client A1 and the identifier of the second client B3. The sharing request are then sent to the second client B1, the second client B2 and the second client B3 correspondingly.

After receiving the sharing requests, the second client B1, the second client B2, and the second client B3 may send respective sharing responses to the first client A1. The second client B1, the second client B2, or the second client B3 sends a sharing response including information of an acceptance of sharing to the first client indicated by the identifier of the first client A1 if a sharing command for accepting the sharing request is received. If a sharing command for rejecting the sharing request is received, a sharing response including information of a rejection of sharing is sent to the first client A1.

Operation a22: The first client A1 receives the sharing responses sent by the second client B1, the second client B2, and the second client B3.

The sharing responses include information of an acceptance or rejection of sharing.

If the second client B1 agrees to share the first business object of the first client A1, the second client B1 may send a sharing response containing information of acceptance of sharing to the first client A1.

If the second client B2 agrees to share the first business object of the first client A1, the second client B2 may send a sharing response containing information of acceptance of sharing to the first client A1.

If the second client B3 refuses to share the first business object of the first client A1, the second client B3 may send a sharing response containing information of rejection of sharing to the first client A1.

Operation a23: In response to determining that received response(s) include(s) an acceptance of sharing, the first client A1 sends information of a first business object to corresponding second client(s).

The first business object in operation a23 is a first business object displayed in a first display region of the first client.

The assumption in operation a22 is used. In this case, at operation a23, the first client A1 sends information of a first business object to the second client B1, the first client A sends the information of the first business object to the second client B3. In this case, at operation 1201, the first client A1 sends the information of the first business object to the second client B1 and the second client B2 through the communication connections according to the sharing request.

A second approach includes the following operations.

Operation b21: The first client A1 sends a sharing request to the second client B1, the second client B2, and the second client B3.

The sharing request is similar to the one at operation b11, and is not repeatedly described herein.

The second client B1, the second client B2, and the second client B3, consent to conduct information sharing by default, without the need of sending a sharing response to the first client A1, and are informed by the first client through the sharing request that they are going to share with a first business object of the first client A1.

Operation b22: The first client A1 sends the first business object to the second client B1, the second client B2, and the second client B3.

In this case, at operation 1201, the first client A1 sends information of a first business object to the second client B1, the second client B2, and the second client B3 via the communication connections according to a sharing request.

A goal of operation 1201 is to cause each second client of the plurality of second clients to display the first business object in a respective user interface.

Specifically, each second client of the plurality of second clients is caused to display the first business object in the user interface thereof.

In implementation, taking into account of the need of the first client to determine the second clients before sending the sharing request to the plurality of second clients, prior to operation 1201, the method further includes:

Operation c21: Multiple contacts that are selected from a contact list of the first client are received.

The present case is similar to operation c11 of the first embodiment, except that multiple contacts are selected from an interface including a contact list. Following the example at operation 1201, the first client A1 selects the user U21, the user U22, and the user U23.

Since a communication connection is established between the first client A1 and each of the second client B1, the second client B2 and the second client B3, the user U21, the user U22, and the user U23 that are selected are online.

Operation c22: A sharing request is sent to second clients corresponding to information of the selected contacts.

Information of each selected contact may correspond with a second client.

The present case is similar to operation c12, and is not repeatedly described.

Operation c23: The user interfaces are generated.

Operation c22 and operation c23 are similar to operation c12 and operation C13 respectively. In addition to having a conventional function of an instant communication client, the first client herein further includes functions of browsing first business object(s) and sharing of information of the first business object(s) multiple second clients.

Operation 1202: When an operation command of the first client for the first business object is received, an operation is performed on the first business object in a user interface of the first client based on the operation command.

Details of implementations at operation 1202 are similar to the details of implementations at operation 302, and are not repeatedly described.

Operation 1203: The operation command is sent to the plurality of second clients.

Specifically, the operation command may be sent to the plurality of second clients through communication connections.

A purpose of sending the operation command to the plurality of second clients at operation 1203 is to cause a second client of the plurality of second clients to perform an operation on the first business object in a user interface of the second client according to operation command.

Each second client of the plurality of second clients is made to perform an operation on the first business object in a user interface of the respective second client according to operation command.

Details of implementations at operation 1203 are similar to the details of implementations at operation 303, and are not repeatedly described.

The foregoing operations 1201-1203 enable a first client and a plurality of second clients to synchronously browse a first business object, and to synchronously browse changes in the first business object caused by an operation of the first client, while having a second display region for instant communications between the first client and the plurality of second clients. This makes it possible for a same first client or a same second client to browse the first business object on the one side and provide comments on the other side at the same time. Furthermore, since the first client sends an operation command on the first business object to the plurality of second clients, a second client of the plurality of second clients can perform an operation on the first business object, such that comments provided from the plurality of second clients can match with business operations of the first business object. Therefore, a face-to-face mutual sharing effect of the first client and the plurality of second clients is achieved, ensuring an efficient sharing of the first business object by the first client and the plurality of second clients.

Beneficial effects of the above solutions of transmitting a business object between a first client and a plurality of second clients are described with reference to the following scenarios.

First application scenario: If the user U11 needs to provide an explanation about a first business object to the user U21 and the user U22, and such explanation needs to cope with a change brought about by an operation on the first business object, the user U11 may input an operation command for the first business object in the first client A1 to have the first client A1 performed the operation command, and transmitted the operation command to the second client B1 and the second client B2. The second client B1 and the second client B2 perform the operation command. At this time, the second client B1 and the second client B2 can be synchronized to browse first business object and a change brought about by an operation of the first client A1. Combined with instant communication messages, a visual explanation can be given to the second client B1 and a second client B2, similar to effects in a real classroom in which a teacher teaches more than one student about the first business object, thus making communications more effective and convenient.

Second application scenario: The user U11 is visiting a shopping site, and is interested in description of a product P1 that is browsed. The user U11 needs to share the description of the product P1 with his/her two buddies, the user U21 and the user U22, so that the user U22 and the user U21 can synchronously browse the product P1, perform operations on the description of the product P1 (for example, zooming in or out a picture of the product zoom to achieve viewing all the details of the product, etc.) and provide comments on the product. The first user U11 can input an operation command for the description information of the product P1 in the first client A1, for the first client A1 to perform the operation command, and transmit the operation command to the second client B1 and the second client B2. The second client B1 and the second client B2 perform the operation command. In this case, the user U21 and the user U22 can see in synchronization with the first client A1 about browsing of the shared description information of the product P1 and changes in the description information of the product P1 caused by the operation command, intuitively know a current focus of the first client A1 on the product and provide comments. This successfully simulates an effect of visiting a shopping site face-to-face with multiple persons in reality, thus making communications more effective and convenient.

Taking into account of the need of transmitting instant communication messages while sharing a first business object to help the plurality of second clients to know comments of the first client given to the first business object, the second display region in implementation includes an instant communication message input sub-region. The method further includes receiving instant communication message inputted in the instant communication message input sub-region, and sending the instant communication message to the plurality of second clients, so that a second client of the plurality of second clients displays the inputted instant communication message in a user interface thereof.

In addition, the client also needs to obtain some or all of the comments about the first business object that are given by the plurality of second clients, and communicate with the plurality of second clients. In implementation, the second display region may further include an instant communication message display sub-region. The method further includes receiving and displaying instant communication messages sent by the plurality of second clients, wherein the instant communication messages displayed in the first instant communication message display sub-region and/or the first display region of the first client.

Furthermore, based on the above solutions, the second embodiment of the present disclosure further provides three exemplary solutions as follows.

First Exemplary Solution

For a second client of the plurality of second clients, the first client performs an operation on the first business object of the user interface of the first client according to an operation command in response to receiving the operation command for the first business object of the second client sent from the second client.

The first exemplary solution here may be directed to each second client of the plurality of second clients.

Details of implementations and technical effects of the first exemplary solution here and the first exemplary solution of the first embodiment are similar, and related content of the first exemplary solution of the first embodiment can be referenced. Although the first client may receive a plurality of operation commands from multiple second clients, a process of execution of each operation command is a repetition of the process of execution of the first exemplary solution of the first embodiment, such that the first client may synchronously browse changes in the first business object that are caused by operations of the multiple second clients, thus enhancing the efficiency of communication.

Second Exemplary Solution

Figure 13:
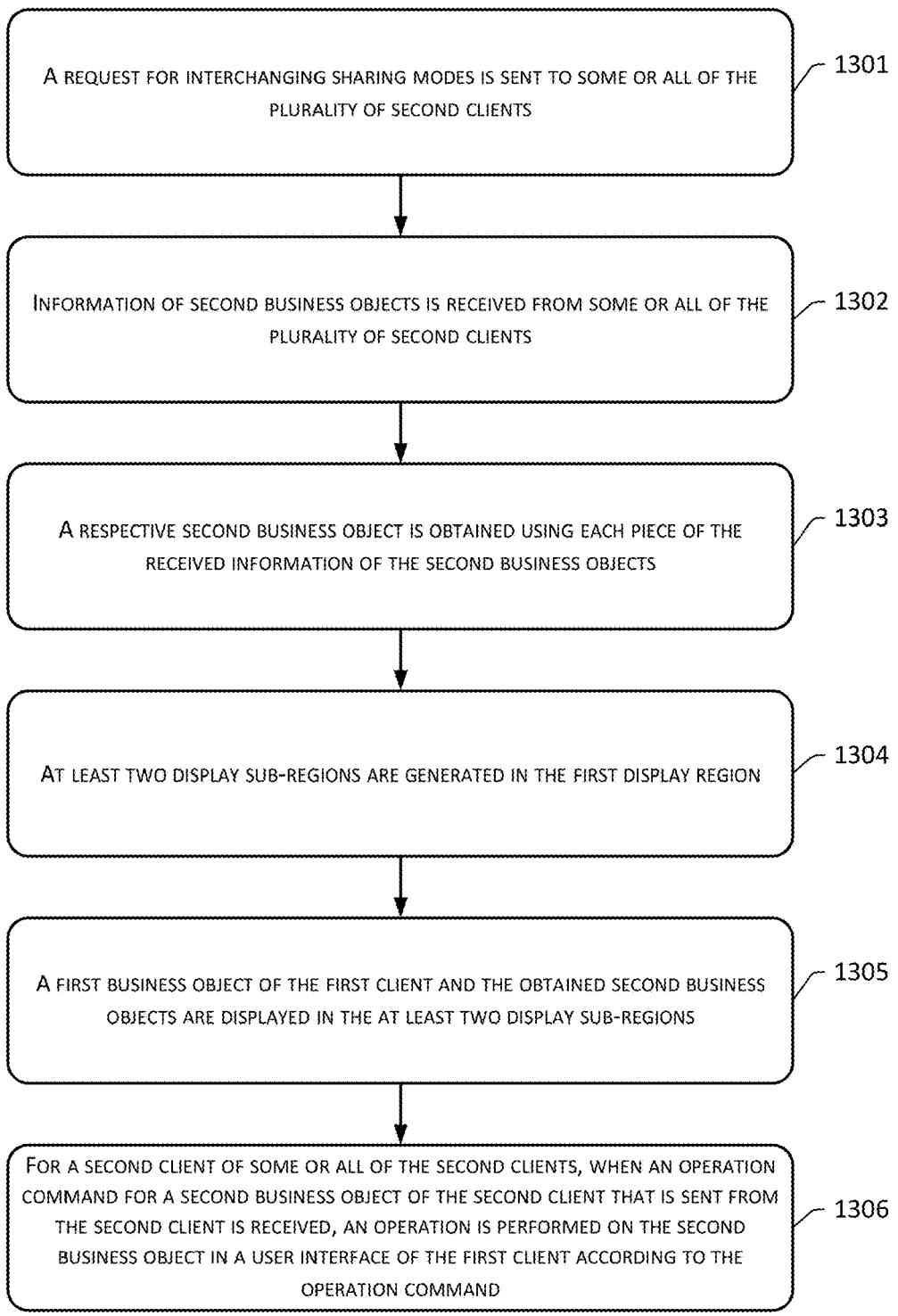
FIG. 13 shows a flowchart of a second method of transmitting a business object in accordance with the second embodiment of the present disclosure.

Based on the foregoing operations 1201-1203, the method further includes the following operations as shown in FIG. 13.

Operation 1301: A request for interchanging sharing modes is sent to some or all of the plurality of second clients.

The plurality of second clients at operation 1301 are the plurality of the second clients at operation 1201. The first client can selectively send a request for interchanging sharing modes to second client(s) of the plurality of the second clients based on demand at operation 1201, and therefore sends the request for interchanging sharing modes to some or all of the plurality of the second clients.

Operation 1302: Information of second business objects is received from some or all of the plurality of second clients.

A piece of information of a second business object corresponds to a second client.

Following the example at operation 1201, if the first client A1 sends a request for interchanging sharing modes to the second client B1 and the second client B2, and the second client B1 and the second client B2 accept the request of the first client for interchanging sharing modes, the first client A1 receives information of a second business object from the second client B1, and receives of a second business object from the second client B2 at operation 1302. The information of the second business object sent by the second client B1 corresponding to the second client B1, and the information of the second business object sent by the second client B2 corresponding to second client B2.

Operation 1303: A respective second business object is obtained using each piece of the received information of the second business objects.

A second business object that is obtained is a second business object of a second client corresponding to information of the second business object.

Following the example at operation 1302, the first client A1 obtains the second business object of the second client B1 using the information of the second business object sent from the second client B1. The first client A1 obtains the second business object of the second client B2 using the information of the second business object sent from the second client B2.

Other details of implementations of operations 1301-1303 are similar to operations 901-903 in the first embodiment, and are not repeatedly described herein.

Operation 1304: At least two display sub-regions are generated in the first display region.

Since at least one second business object is obtained at operation 1303, and the first client has a first business object, at least two display sub-regions are generated in order for each display sub-region to display the first business object or the second business object.

The at least two generated display sub-regions may be a horizontal bar structure, or may be a structure having a mixture of horizontal and vertical bars, which is not limited in the present disclosure.

Typically, a display sub-region may be generated for each second business object that is obtained.

Following the example at operation 1303, three display sub-regions may be generated in the first display region at operation 1304.

Operation 1305: The first business object of the first client and the obtained second business objects are displayed in the at least two display sub-regions.

Figure 14:
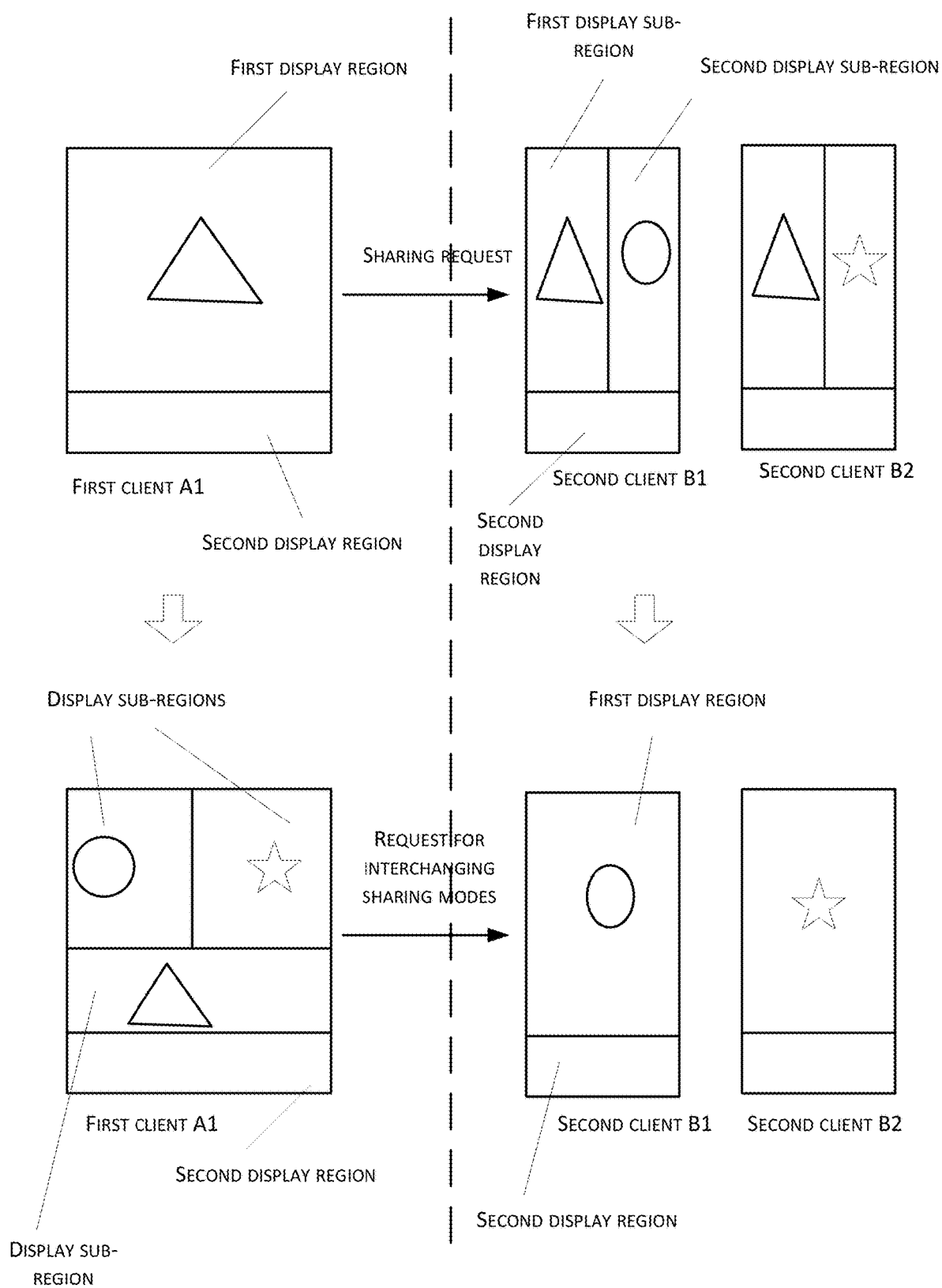
FIG. 14 shows a schematic diagram of user interfaces of a first client A1 and a second client B1 before and after a request for interchanging sharing modes in accordance with the second embodiment of the present disclosure.

Following the example at operation 1303, in this case, schematic diagrams of the user interface of the first client A1, and the user interfaces of the second client B1 and the second client and B2 become the ones shown in FIG. 14.

In FIG. 14, a circle is used to represent the second business object of the second client B1, a five-pointed star is used to represent the second business object of the second client B2, and a triangle is still used to represent the first business object of the first client A1. FIG. 14 shows a hybrid structure of cross and vertical bars.

Operation 1306: For a second client of some or all of the second clients, when an operation command for a second business object of the second client that is sent from the second client is received, an operation is performed on the second business object in a user interface of the first client according to the operation command.

Following the example at operation 1305, a first business object (description information of a product P1), a second business object (description information of a product P2) of the second client B1 and a second business object (description information of a product P3) of the second client B2 are displayed in the first client A1.

When the user U21 manipulates the description information of the product P2 that is displayed in the user interface of the second client B1, the user U11 can synchronously browse changes caused by the manipulation of the user U21 of the description information of the product P2 using operation 1306.

Similarly, when the user U21 manipulates the description information of the product P3 that is displayed in the user interface of the second client B3, the user U11 can synchronously browse changes caused by the manipulation of the user U22 of the description information of the product P3 using operation 1306.

Other details of implementations and technical effects of the second exemplary solution here are similar to those of the second exemplary solution of the first embodiment, and reference can be made to the second exemplary solution of the first embodiment. Although the first client sends a request for interchanging sharing modes to some or all of the second clients, this can be understood as repeating an execution process of the above second exemplary solution for multiple times, such that the first client may synchronously browse changes caused by operations of second clients on respective second business objects, thus enhancing the efficiency of communications.

Third Exemplary Solution

The third exemplary solution is an exemplary solution based on the second exemplary solution.

When an operation command for a second business object of the first client, an operation is performed on the second business object in the user interface of the first client based on the operation command, and the operation command is transmitted to a second client to which second business object belongs to, to cause the second client to perform an operation on the second business object of a user interface of the second client based on the operation command.

Following the example at operation 1305, a first business object (description information of a product P1), a second business object (description information of a product P2) of the second client B1 and a second business object (description information of a product P3) of the second client B2 are displayed in the first client A1.

In the third exemplary solution, after the user U11 inputs an operation command for the description information of the product P2 displayed in the first client A1, the first client A1 performs an operation on the description information of the product P2 according to the operation command, and transmits the operation command to the second client B1, to cause the client B1 to perform an operation on the description information of the product P2 on the user interface thereof.

When the user U11 inputs an operation command for the description information of the product P3 displayed in the first client A1, the first client A1 performs an operation on the description information of the product P3 according to the operation command, and transmits the operation command to the second client B2, to cause the client B2 to perform an operation on the description information of the product P3 on the user interface thereof.

Other details of implementations and technical effects of the third exemplary solution here are similar to those of the third exemplary solution of the first embodiment, and reference can be made to the third exemplary solution of the first embodiment. Although the first client sends a request for interchanging sharing modes to some or all of the second clients, this can be understood as repeating an execution process of the above third exemplary solution for multiple times, such that the first client may synchronously browse changes caused by operations of second clients on respective second business objects, thus enhancing the efficiency of communications.

In the second embodiment of the present disclosure, although a first client sends information of a first business object and an operation command for the first business object of the first client to a plurality of second clients, for each second client of the plurality of second clients, one first client is what each corresponds to, and received information is also a first business object and an operation command for the first business object of the first client from that one first client. Therefore, a method of transmitting a business object with each second client as an execution body in the second embodiment is the same as the method of transmitting a business object with a second client as an execution entity in the first embodiment, and is not repeatedly described herein.

Further, other details of implementations of the second embodiment of the present disclosure can be referenced related content of the first embodiment, and are not repeatedly described herein.

Third Embodiment

The third embodiment of the present disclosure provides a description of a method of transmitting a business object between a plurality of first clients and a plurality of second clients.

Under a situation in which business objects are transmitted between a plurality of first clients and a plurality of second clients, for each first client of the plurality of the first clients, a method of transmitting a business object with the plurality of second clients is the same as the method of transmitting a business object with the first client as an execution entity. Therefore, the third embodiment does not repeat the method of transmitting the business object with the first client as the execution entity.

However, it is different for a second client. In the method of transmitting business objects between a first client and a plurality of second clients in the first embodiment, each second client of the plurality of second clients only conducts a transmission of a business object with a first client. In the method of transmission between a plurality of first clients and a plurality of second clients, each second client can conduct transmission of business objects with multiple first clients. A second client is used herein as an execution entity, for description of a method of transmitting business objects between the second client and a plurality of first objects.

Figure 15:
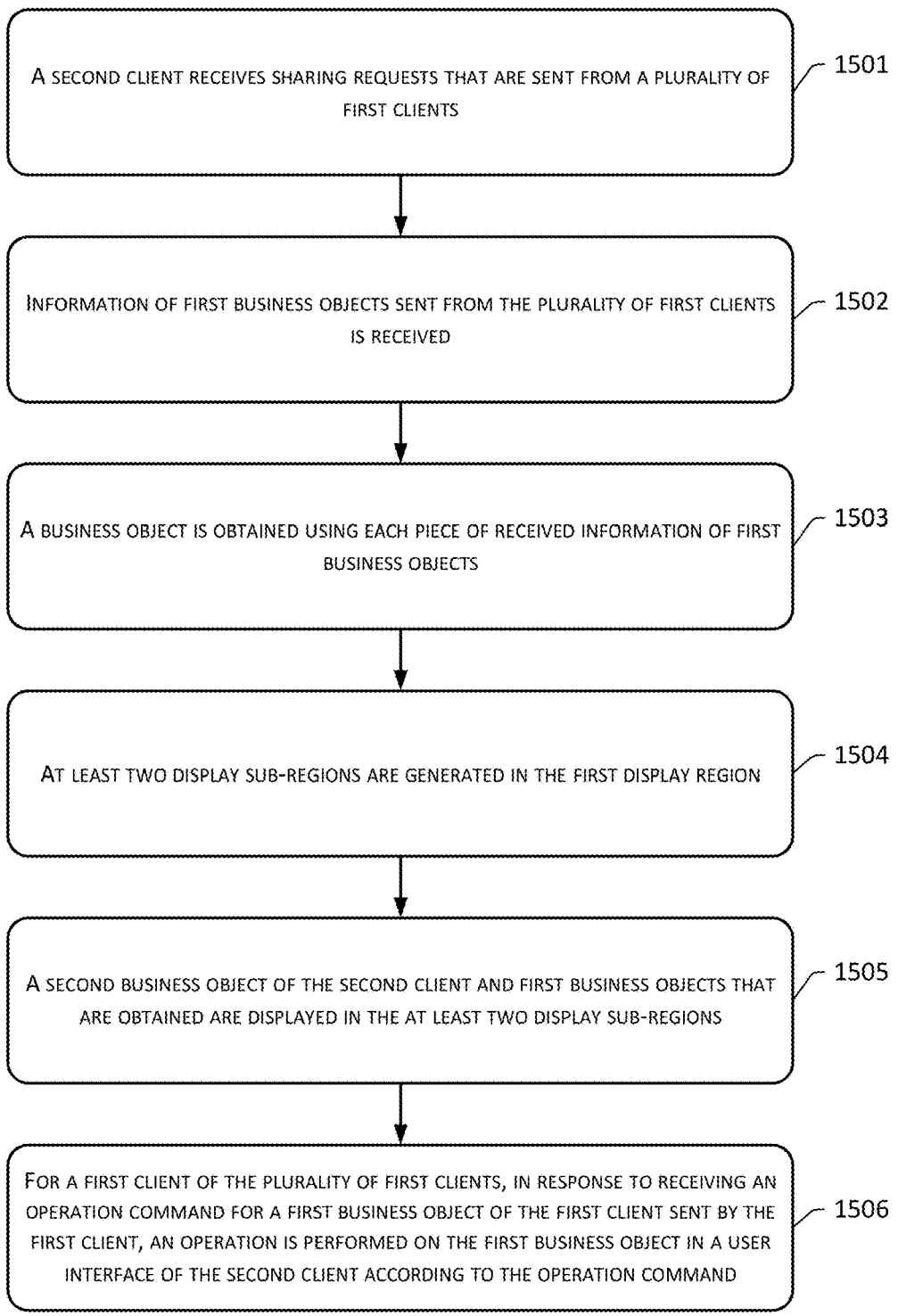
FIG. 15 shows a flowchart of a first method of transmitting a business object in accordance with the third embodiment of the present disclosure.

FIG. 15 shows a flowchart of a method of transmitting business objects provided by the third embodiment of the present disclosure, and includes the following operations.

Operation 1501: A second client receives sharing requests that are sent from a plurality of first clients.

Since a plurality of first clients send sharing requests to a second client, what the second client receives are the sharing requests sent by the plurality of first clients.

After receiving a respective sharing request sent from each first client, the second client may know that a first business object of the first client is going to be shared with.

When browsing description information of a product of interest, the user U11 can sends a sharing request to the second client through the first client A1 if desiring to get help and advice from the user U21 to decide whether to make a purchase.

At the same time, when browsing description information of a product of interest, the user U12 can sends a sharing request to the second client through the first client A2 if desiring to get help and advice from the user U21 to decide whether to make a purchase. In this case, the second client B1 receives sharing requests from the first client A1 and the first client A2.

Operation 1502: Information of first business objects sent from the plurality of first clients is received.

A first client of the plurality of first clients may send information of a first business object to the second client.

Operation 1503: A business object is obtained using each piece of received information of first business objects.

The first business object that is obtained is a first business object of a first client corresponding to the respective piece of information of the first business object.

Operation 1504: At least two display sub-regions are generated in the first display region.

Operation 1505: A second business object of the second client and first business objects that are obtained are displayed in the at least two display sub-regions.

Operation 1506: For a first client of the plurality of first clients, in response to receiving an operation command for a first business object of the first client sent by the first client, an operation is performed on the first business object in a user interface of the second client according to the operation command.

The foregoing operations 1503-1506 are similar to operations 1303-1306 in the second embodiments. A difference therebetween is that operations 1503-1506 are primarily concerned with a first business object of a first client, and operations 1303-1306 are primarily concerned is a second object of a second business client. Details of implementations may be referenced to the foregoing operations 1303-1306, and are not repeatedly described herein.

Using the above solution, a second client may simultaneously browse first business objects of a plurality of first clients and changes made to each first business object due to an operation of a respective first client, as well as conduct instant communication interactions with each first client. When a shopping scenario is applied at operation 1501, the user U21 can simultaneously provide advices to the user U11 and the user U12, which is equivalent to the user U21 accompanying the user U11 to visit a shopping site, while accompanying the user U12 to visit a shopping website at the same time, thus improving the efficiency of communications.

Based on the solution shown in FIG. 15, the third embodiment of the present disclosure further provides three exemplary solutions as follows.

First Exemplary Solution

When an operation command for the first business object of the second client is received, an operation is performed on the first business object in the user interface of the second client according to the operation command, and the operation command is transmitted to a first client to which the first business object belongs, so that the first client performs an operation on the first business object on a user interface thereof according to the operation command.

Details of implementations and achieved beneficial effects of the first exemplary solution here are similar to the second exemplary solution of the second embodiment, and the details thereof can be referenced to the description of the second exemplary solution of the second embodiment, and are not repeatedly described herein.

Second Exemplary Solution

Figure 16:
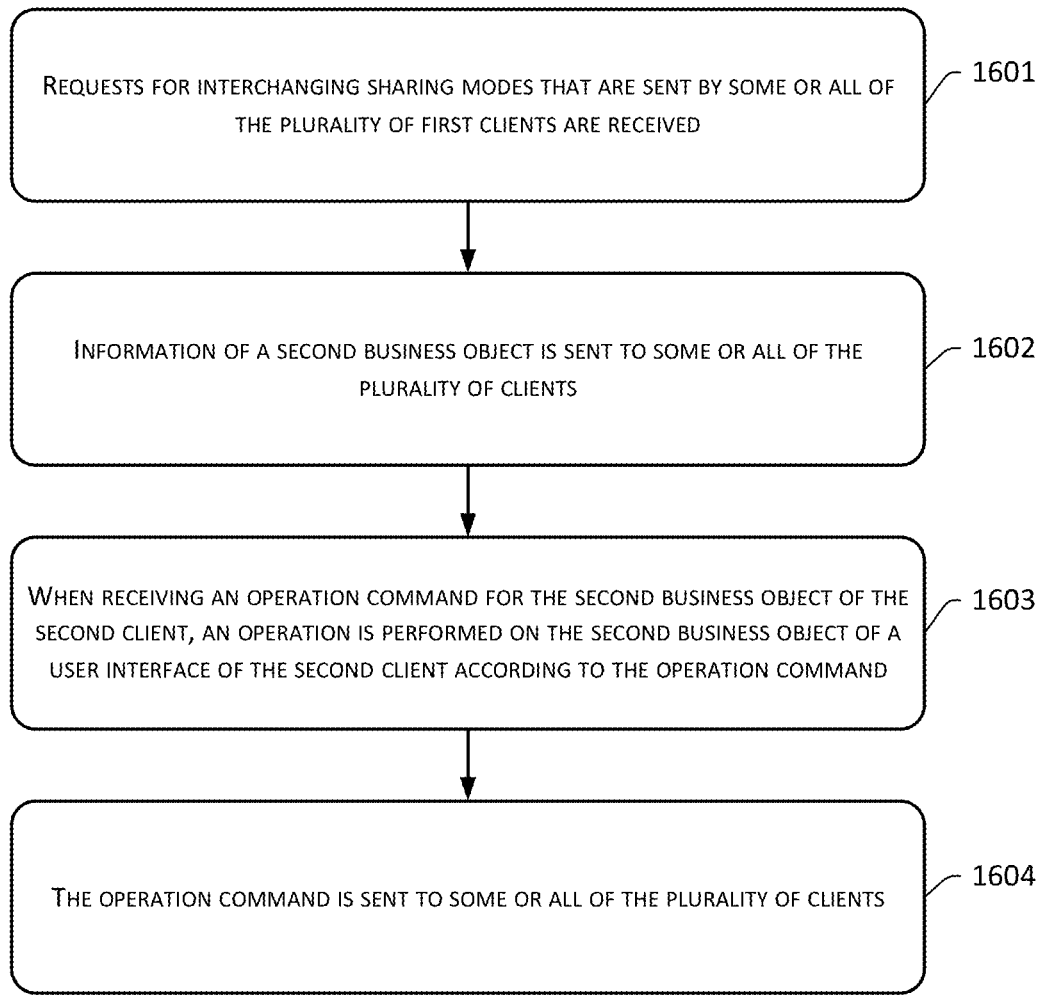
FIG. 16 shows a flowchart of a second method of transmitting a business object in accordance with the third embodiment of the present disclosure.

FIG. 16 shows a flowchart of the second exemplary solution of the third embodiment, and includes the following operations.

Operation 1601: Requests for interchanging sharing modes that are sent by some or all of the plurality of first clients are received.

Operation 1602: Information of a second business object is sent to some or all of the plurality of clients, so that the second business object is displayed in a user interface of a first client of some or all of the plurality of clients.

Operation 1603: When receiving an operation command for the second business object of the second client, an operation is performed on the second business object of a user interface of the second client according to the operation command.

Operation 1604: The operation command is sent to some or all of the plurality of clients.

A purpose of operation 1604 is to cause a first client of some or all of the plurality of clients to perform an operation on the second business object in a user interface thereof according to the operation command.

The foregoing operations 1602-1604 are similar to operations 1201-1203 of the second embodiment. A difference therebetween is that operations 1201-1203 are executed by a first client which sends information of a first object and an operation command for the first business object to a plurality of second clients, whereas a second client is an execution entity in the current case, and sends information of a second business object of the second client and an operation command for the second business object to some or all of a plurality of first clients responsive to requests for interchanging sharing modes that are sent from some of all of the plurality of first clients. Correspondingly, technical effects achieved by the second exemplary solution here are also similar to those of the solution in operations 1201-1203, and are not repeatedly described herein.

The above second exemplary solution may also be performed based on the first exemplary solution.

Third Exemplary Solution

The third exemplary solution may be performed based on the second solution of the third embodiments.

For a first client of some or all of a plurality of first clients, when an operation command for a second business object of the first client that is sent by the first client is received, an operation is performed on the second business object in a user interface of the second client.

The third exemplary solution here is similar to the second exemplary solution of the second embodiment. Details of implementations thereof can be referenced to the description of the second exemplary solution of the second embodiment, and are not repeatedly described herein.

Other details of implementations of the third embodiment of the present disclosure can be referenced to related content of the first embodiment and the second embodiment, and are not repeatedly described herein.

Fourth Embodiment

Based on the same concept of the first embodiment of the present disclosure, the fourth embodiment of the present disclosure provides a first client and a second client, which are described respectively as follows.

Figure 17:
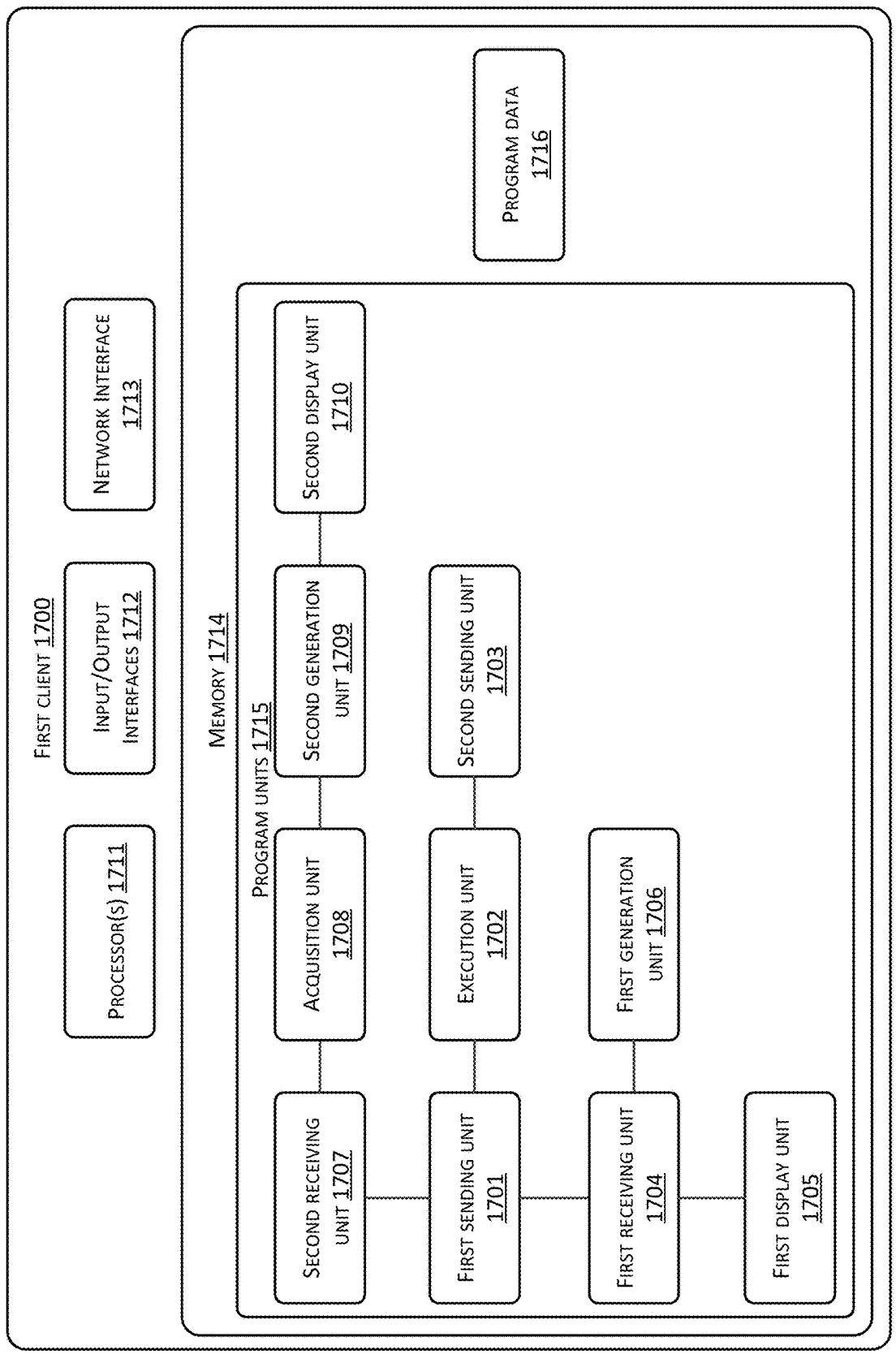
FIG. 17 shows a schematic structural diagram of a first client in accordance with the fourth embodiment of the present disclosure.

FIG. 17 shows a structural diagram of a first client 1700, which includes a first sending unit 1701, an execution unit 1702, and the second sending unit 1703.

The first sending unit 1701 is configured to send information of a first business object to a second client according to a sharing request, to cause the second client to display the first business object in a user interface thereof.

The execution unit 1702 is configured to perform an operation on the first business object in a user interface of the first client according to an operation command in response to receiving the operation command for the first business object of the first client.

The second sending unit 1703 is configured to send the operation command to the second client, to cause the second client to perform an operation on the first business object in the user interface thereof according to the operation command.

In implementation, a second display region includes an instant communication message input sub-region, and the first client further includes a first receiving unit 1704 configured to receive an instant communication message inputted in instant communication message input sub-region, wherein the first sending unit 1701 is further configured to send the instant communication message to the second client to enable the second client to display the instant communication message in the user interface thereof.

In implementation, the second display region further includes an instant communication message display sub-region, and the first client further includes a first display unit 1705.

The first receiving unit 1704 is further configured to receive the instant communication message that is sent from the second client, and the first display unit 1705 is configured to display the instant communication message that is sent from the second client, the instant communication message sent by the second client being displayed in the instant communication message display sub-region and/or a first display region of the first client.

In implementation, communication connections include a sharing connection and instant communication connection. The sharing connection is used for transmission of the first business object and/or the operation command of the first client, and the instant communication connection is used for transmission of instant communication message and/or the information of the first business object.

In implementation, the communication connection is an instant communication connection. The instant communication connection is used for transmission of the information of the first business object, the operation command, and the instant communication message.

In implementation, the first client further includes a first generation unit 1706.

The first receiving unit 1704 is further configured to receive contact information selected from a contact list of the first client before the first sending unit sends the information of the first business object to the second client according to prior the sharing request.

The first sending unit 1701 is further configured to send the sharing request to the second client corresponding to the selected contact information.

The first generating unit 1706 is configured to generate the user interface.

In implementation, the communication connection is a communication connection established by a server between the first client and the second client, and the information of the first business object is an identifier of the first business object.

The first sending unit 1701 is used for sending the identifier of the first business object to the server according to the sharing request, to enable the server to obtain a link associated with the first business object corresponding to the identifier of the first business object from stored correspondence relationships between identifiers of business objects and links of the business objects, and send the obtained link associated with the first business object to the second client.

In implementation, the operation command is inputted through a touch screen, and includes at least one of a sliding command, a zoom-in command, a zoom-out command, a dragging command, and a selection command.

In implementation, a user interface of the second client includes a first display region and second display region. The first display region of the second client is used for displaying a second business object, and the second display region of the second client used for instant communications between the first client and the second client.

The first sending unit 1701 is configured to send the information of the first business object to the second client according to the sharing request, to cause the second client to generate a first display sub-region and a second display sub-region in the first display region of the second client, and display the first business object in the first display sub-region or the second display sub-region of the interface thereof.

In implementation, the execution unit 1702 is further configured to perform an operation on the first business object in the user interface of the first client according to an operation command, in response to receiving the operation command for the first business object of the second client from the second client.

In implementation, the first client further includes a second receiving unit 1707, an acquisition unit 1708, a second generation unit 1709, and a second display unit 1710.

The first sending unit 1701 is further configured to send a request for interchanging sharing modes to the second client.

The second receiving unit 1707 is configured to receiving information of a second business object from the second client.

The acquisition unit 1708 is configured to obtain the second business object using the information of the second business object.

The second generation unit 1709 is configured to generate a first display sub-region and a second display sub-region in a first display region of the first client.

The second display unit 1710 is configured to display for the first business object of the first client and the obtained second business object in the first display sub-region and the second display sub-region of the first client.

The execution unit 1702 is further configured to perform an operation on the second business object in the user interface of the first client according to an operation command in response to receiving the operation command for the second business object of the second client sent by the second client.

In implementation, the execution unit 1702 is further configured to an operation on the second business object in the user interface of the first client according to an operation command in response to receiving the operation command for the second business object of the first client.

The second sending unit 1703 is further configured to send the operation command to the second client, to cause the second client to perform an operation on the second business object in the user interface thereof according to the operation command.

In implementations, the first client 1700 may further include one or more processors 1711, an input/output (I/O) interface 1712, a network interface 1713, and memory 1714.

The memory 1714 may include a form of computer readable media such as a volatile memory, a random access memory (RAM) and/or a non-volatile memory, for example, a read-only memory (ROM) or a flash RAM. The memory 1714 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1714 may include program units 1715 and program data 1716. The program units 1715 may include one or more of the foregoing units as shown in FIG. 17.

Figure 18:
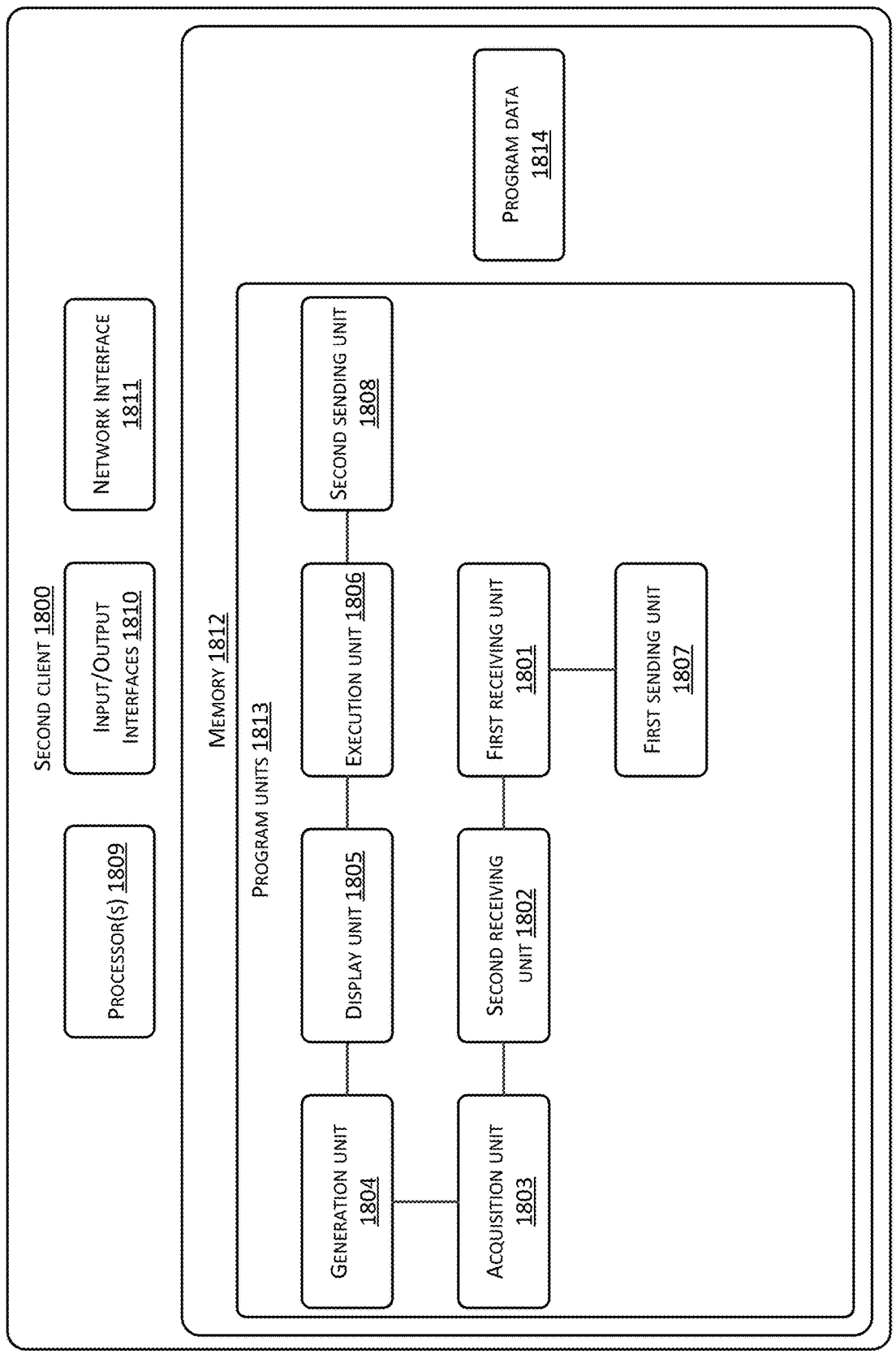
FIG. 18 shows a schematic structural diagram of a second client in accordance with the fourth embodiment of the present disclosure.

FIG. 18 shows a schematic structural diagram of a second client 1800, which includes a first receiving unit 1801, a second receiving unit 1802, an acquisition unit 1803, a generation unit 1804, a display unit 1805, and an execution unit 1806.

The first receiving unit 1801 is configured to receive a sharing request sent by a first client.

The second receiving unit 1802 is configured to receive information of a first business object from the first client.

The acquisition unit 1803 is configured to obtain the first business object using the information of the first business object.

The generation unit 1804 is configured to generate a first display sub-region and a second display sub-region in a first display region of the second client.

The display unit 1805 is configured to display the obtained first business object in the first display sub-region or the second display sub-region.

The execution unit 1806 is configured to perform an operation on the first business object in a user interface of the second client according to an operation command in response to receiving the operation command for the first business object of the first client from the first client sent.

In implementation, the second display region includes an instant communication message display sub-region.

The first receiving unit 1801 is further configured to receive an instant communication message sent by the first client.

The display unit 1805 is further configured to display the instant communication message sent by the first client, the instant communication message being displayed in at least one of three display sub-regions: the instant communication message display sub-region of the second client, the first display sub-region, and the second display sub-region.

In implementation, the second display region further includes an instant communication message input sub-region, and the second client further includes a first sending unit 1807.

The first receiving unit 1801 is further configured to receive an instant communication message inputted in the instant communication message input sub-region.

The first sending unit 1807 is configured to send the instant communication message to the first client, to enable the first client to display the instant communication message in a user interface thereof.

In implementation, the second client further includes a second sending unit 1808.

The execution unit 1806 is further configured to perform an operation on the first business object in the user interface of the second client according to an operation command in response to receiving the operation command for the first business object of the second client.

The second sending unit 1808 is configured to send the operation command to the first client, to cause the first client to perform an operation on the first business object in the user interface according to the operation command.

In implementation, the second client further includes a second sending unit 1808.

The first receiving unit 1801 is further configured to receive a request for interchanging sharing modes from the first client.

The second sending unit 1808 is configured to send information of the second business object to the first client, to enable the first client to display the second business object in the user interface thereof.

The execution unit 1806 is further configured to perform an operation on the second business object in the user interface of the second client according to an operation command in response to receiving the operation command for the second business object for the second client.

The second sending unit 1808 is further configured to send the operation command to the first client, to cause the first client to perform an operation on the second business object in the user interface thereof.

In implementation, the execution unit 1806 is further configured to perform an operation on the second business object in the user interface of the second client according to an operation command in response to receiving the operation command for the second business object of the first client that is sent from the first client.

In implementations, the second client 1800 may include one or more processors 1809, an input/output (I/O) interface 1810, a network interface 1811, and memory 1812. The memory 1812 may include a form of computer readable media as described in the foregoing description.

In implementations, the memory 1812 may include program units 1813 and program data 1814. The program units 1813 may include one or more foregoing units as shown in FIG. 18.

Fifth Embodiment

Figure 19:
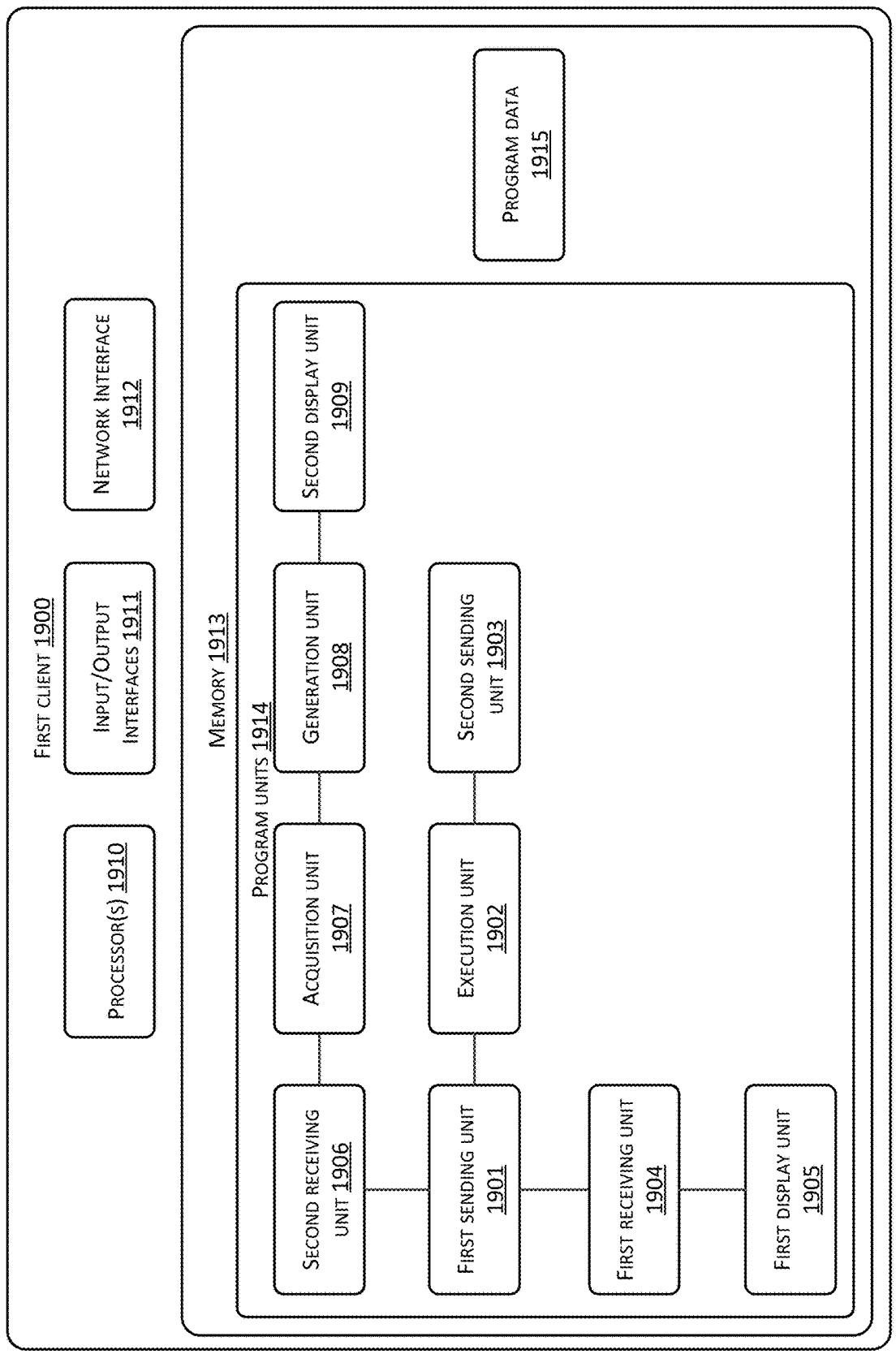
FIG. 19 shows a schematic structural diagram of a first client in accordance with the fifth embodiment of the present disclosure.

Based on the same inventive concept of the second embodiment, the fifth embodiment of the present disclosure provides a first client 1900, having a structure as shown in the schematic diagram of FIG. 19, including a first sending unit 1901, an execution unit 1902, and a second sending unit 1903.

The first sending unit 1901 is configured to send information of a first business object to a plurality of second clients, to enable a second client of the plurality of second clients to display the first business object in a user interface thereof.

The execution unit 1902 is configured to perform an operation on the first business object in a user interface of the first client according to an operation command in response to receiving the operation command for the first business object.

The second sending unit 1903 is configured to send the operation command to the plurality of second clients, to cause the second client of the plurality of second clients to perform an operation on the first business object in the user interface thereof according to the operation command.

In implementation, a second display region includes an instant communication message input sub-region, and the first client further includes a first receiving unit 1904.

The first receiving unit 1904 is configured to receive an instant communication message inputted in the instant communication message input sub-region.

The first sending unit 1901 is further configured to send the instant communication message to the plurality of second clients, to cause the second client of the plurality of the second clients to display the instant communication message in the user interface of the second client.

In implementation, the second display region further comprises an instant communication message display sub-region, and the first client further includes a first display unit 1905.

The first receiving unit 1904 is further configured to receive instant communication message that are sent from the plurality of second clients.

The first display unit 1905 is further configured to display the instant communication message that are sent from the plurality of second clients, the instant communication messages being displayed in the instant communication message display sub-region and/or a first display region.

In implementation, the execution unit 1902 is further configured to perform an operation on the first business object in the user interface of the first client according to an operation command in response to receiving the operation command for the first business object of the second client from the second client of the plurality of second clients.

In implementation, the first client further includes a second receiving unit 1906, an acquisition unit 1907, a second generation unit 1908, and display unit 1909;

The first sending unit 1901 is further configured to send a request for interchanging sharing modes to some or all of the plurality of second clients.

The second receiving unit 1906 is configured to receive second business object information from some or all of the plurality of second clients, wherein each piece of the second business object information corresponding to a respective second client.

The obtaining unit 1907 is configured to obtain a respective second business object using each piece of the received second business object information, wherein the obtained second business object is a second business object corresponding to the respective piece of the second business object information.

The generation unit 1908 is configured to generate at least two display sub-regions in the first display region.

The second display unit 1909 is configured to display the first business object of the first client and the obtained business objects in the at least two display sub-regions.

The execution unit 1902 is further configured to perform an operation on the second business object in the user interface of the first client according to an operation command in response to receiving the operation command for the second business object of the second client that is sent from the second client, the second client being one of some or all of the plurality of second clients.

In implementation, the execution unit 1902 is further configured to perform an operation on the second business object in the user interface of the first client according to an operation command in response to receiving the operation command for the second business object of the first client.

The second sending unit 1903 is further configured to send the operation command to the second client to which the second business object belongs, to cause the second client to perform an operation on the second business object in the user interface of the second client according to the operation command.

In implementations, the first client 1900 may include one or more processors 1910, an input/output (I/O) interface 1911, a network interface 1912, and memory 1913. The memory 1913 may include a form of computer readable media as described in the foregoing description.

In implementations, the memory 1913 may include program units 1914 and program data 1915. The program units 1914 may include one or more foregoing units as shown in FIG. 19.

Sixth Embodiment

Figure 20:
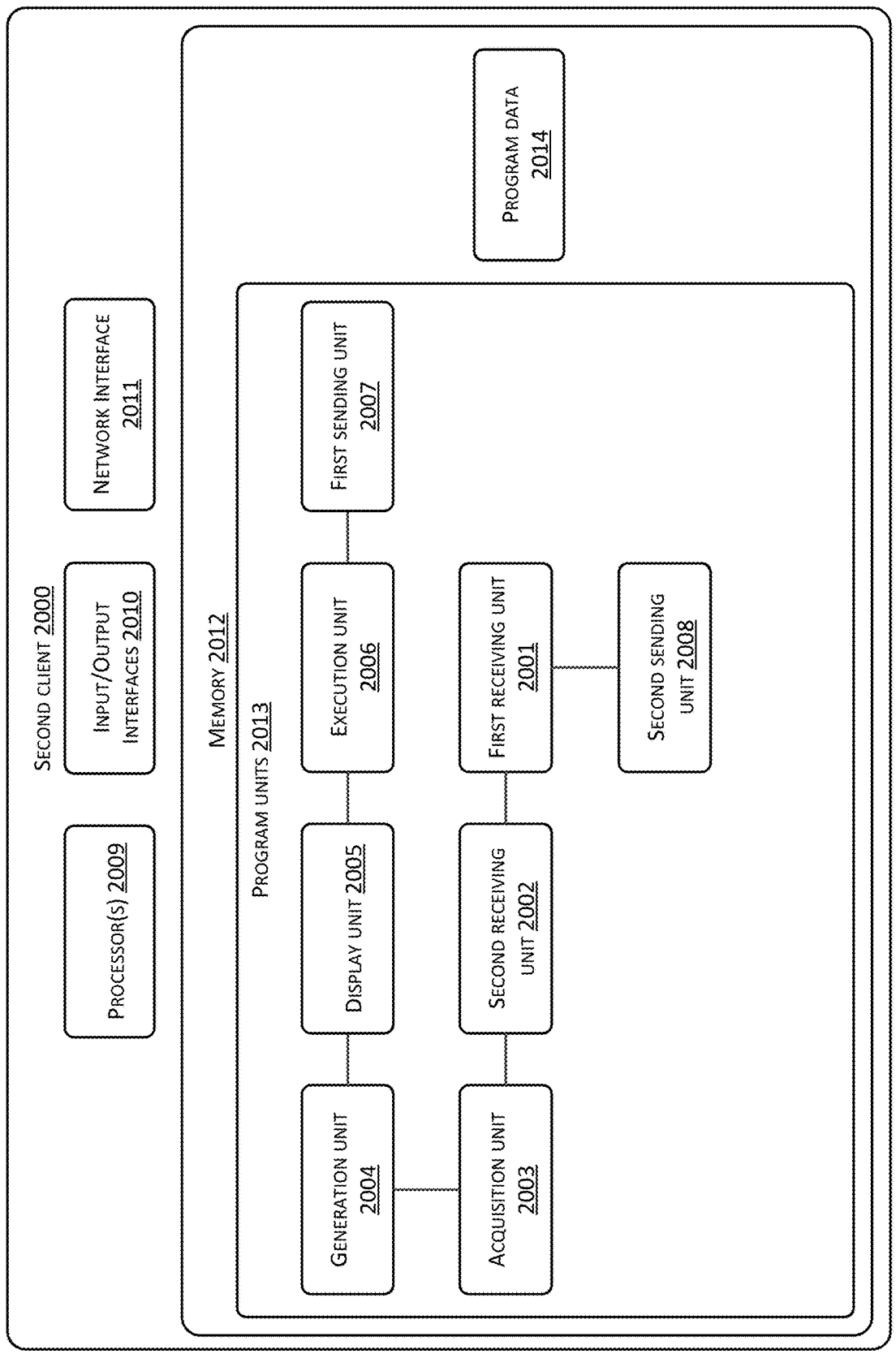
FIG. 20 shows a schematic structural diagram of a second client in accordance with the sixth embodiment of the present disclosure.

Based on the same inventive concept of the third embodiment, the sixth embodiment of the present disclosure provides a second client 2000, with a structure as shown in the schematic diagram of FIG. 20, including a first receiving unit 2001, a second receiving unit 2002, an acquisition unit 2003, a generation unit 2004, a display unit 2005, and an execution unit 2006.

The first receiving unit 2001 is configured to receive sharing requests sent by a plurality of first clients.

The second receiving unit 2002 is configured to receive first business object information sent by the plurality of first clients.

The acquisition unit 2003 is configured to obtain a first business object using each piece of the first business object information, wherein the obtained first business object is a first business object of a first client corresponding to the respective piece of the first business object information.

The generation unit 2004 is configured to generate at least two display sub-regions in a first display region.

The display unit 2005 is configured to display a second business object of the second client and the obtained first business objects in the at least two display sub-regions.

The execution unit 2006 is configured to perform an operation on a first business object in a user interface of the second client according to an operation command in response to receiving the operation command for the first business object of a first client from the first client, the first client being one of the plurality of first clients.

In implementation, the second client further includes a first sending unit 2007.

The execution unit 2006 is further configured to perform an operation on a first business object in a user interface of the second client according to an operation command in response to receiving the operation command for the first business object of the second client.

The first sending unit 2007 is further configured to send the operation command a first client object to which the first business object belongs, to cause the first client to perform an operation on the first business object in a user interface thereof according to the operation command.

In implementation, the second client further includes a second sending unit 2008.

The first receiving unit 2001 is further configured to receive requests for interchanging sharing modes from some or all of the plurality of first clients.

The second sending unit 2008 is configured to send information of the second business object to some or all of the plurality of first clients, to cause a first client of some or all of the plurality of first clients to display the second business object in a user interface thereof.

The execution unit 2006 is further configured to perform an operation on the second business object in the user interface of the second client according to an operation command in response to receiving the operation command for the second business object.

The second sending unit 2008 is further configured to send the operation command to some or all of the plurality of first clients, to cause a first client of some or all of the plurality of first clients to perform an operation on the second business object in a user interface thereof according to the operation command.

In implementation, the execution unit 2006 is further configured to perform an operation on the second business object in the user interface of the second client in response to receiving an operation command for the second business object of a first client from the first client, the first client being one of some or all of the plurality of first clients.

In implementations, the second client 2000 may include one or more processors 2009, an input/output (I/O) interface 2010, a network interface 2011, and memory 2012. The memory 2012 may include a form of computer readable media as described in the foregoing description.

In implementations, the memory 2012 may include program units 2013 and program data 2014. The program units 2013 may include one or more foregoing units as shown in FIG. 20.

Through the above description of the embodiments, one skilled in the art can understand that the embodiments of the present disclosure can be implemented in a form of hardware, or software with a necessary universal hardware platform. Based on such understanding, the technical solutions of the embodiments of the present disclosure may be embodied in a form of a software product. The software product may be stored in a non-volatile storage medium (such as a CD-ROM, a U disk, a movable hard disk), and includes instructions that enable a computing device (may be a personal computer, a server, or a network device) to execute the method of each embodiment of the present disclosure.

One skilled in the art can understand that the accompanying drawings are merely schematic diagrams of exemplary embodiments, modules or processes in the accompanying drawings may not be essential to the embodiments of the present disclosure.

One skilled in the art can understand that modules of a terminal in the embodiments may be distributed in the terminal in accordance with the embodiments of the terminal, or may be located in one or more terminals of the embodiments under corresponding modifications. Modules of the embodiments may be combined into a single module, or divided into multiple sub-modules.

Numbers associated with the foregoing embodiments of the present disclosure are merely used for description, and do not represent the superiority or inferiority of the embodiments.

Apparently, one skilled in the art can make various modifications and variations of the present disclosure without departing from the spirit and scope of the present disclosure. Thus, if these modifications and variations of the present disclosure fall within the scope of the claims and their equivalents of the present disclosure, the present disclosure is intended to cover these modifications and variations.

The present disclosure may be further understood with clauses as follows.

Clause 1: A method of transmitting a business object, the method comprising: establishing a communication connection between a first client and a second client, wherein a user interface of the first client includes a first display region and a second display region, the first display region being used for displaying a first business object, and the second display region being used for instant communications between the first client and the second client; sending information of a first business object to the second client by the first client according to a sharing request, to cause the second client to display the first business object in a user interface of the second client; in response to receiving an operation command for the first business object of the first client, performing an operation on the first business object in the user interface of the first client according to the operation command; and sending the operation command to the second client, to cause the second client to perform the operation on the first business object in the user interface of the second client.

Clause 2: The method of Clause 1, wherein the second display region includes an instant communication message input sub-region, and the method further comprises: receiving an instant communication message inputted in the instant communication message input sub-region; and sending the instant communication message to the second client, to cause the second client to display the instant communication message in the user interface of the second client.

Clause 3: The method of Clause 2, wherein the second display region further includes an instant communication message display sub-region, and the method further comprises receiving and displaying an instant communication message sent by the second client, wherein the instant communication message sent by the second client is displayed in the instant communication message display sub-region and/or the first display region of the first client.

Clause 4: The method of Clause 2 or 3, wherein the communication connection includes a sharing connection and an instant communication connection, the sharing connection being used for transmission of the information of the first business object and/or the operation command, and the instant communication connection being used for transmission of the instant communication message and/or the information of the first business object.

Clause 5: The method of Clause 2 or 3, wherein the communication connection includes an instant communication connection, the instant communication connection being used for transmission of the information of the first business object, the operation command, and the instant communication message.

Clause 6: The method of Clause 1, wherein: prior to sending the information of the first business object to the second client by the first client according to the sharing request, the method further comprises: receiving contact information selected from a contact list of the first client; sending the sharing request to the second client, the second client corresponding to the selected contact information; and generating the user interface.

Clause 7: The method of Clause 1, wherein the communication connection is established by a server between the first client and the second client, the information of the first business object includes an identifier of the first business object, and sending the information of the first business object to the second client by the first client according to the sharing request comprises sending the identifier of the first business object to the server by the first client according to the sharing request, to cause the server to obtain a link associated with the first business object corresponding to the identifier of the first business object from stored correspondence relationships between identifiers of business objects and links associated with the business objects, and to send the obtained link associated with the first business object to the second client.

Clause 8: The method of Clause 1, the operation command is inputted via a touch screen, and comprises at least one of a sliding command, a zoom-in command, a zoom-out command, a dragging command, or a selection command.

Clause 9: The method of Clause 1, wherein the user interface of the second client comprises a first display region and a second display region, the first display region of the second client being used for displaying a second business object, and the second display region of the second client being used for instant communications between the first client and the second client, and wherein the second client displaying the first business object in the user interface of the second client comprises: the second client generating a first display sub-region and a second display sub-region in the first display region of the user interface of the second client; and the second client displaying the first business object in the first display sub-region or the second display sub-region of the user interface of the second client.

Clause 10: The method of any one of Clause 1-3 and 6-9, the method further comprising performing an operation on the first business object in the user interface of the first client according to an operation command for the first business object of the second client in response to receiving the operation command from the second client.

Clause 11: The method of any one of Clause 1-3 and 6-9, the method further comprising: sending a request for interchanging sharing modes to the second client; receiving information of a second business object from the second client; obtaining the second business object using the information of the second business object; generating a first display sub-region and a second display sub-region in a first display region of the first client; displaying the first business object of the first client and the obtained second business object in the first display sub-region and the second display sub-region of the first client; and performing an operation on the second business object in the user interface of the first client according to an operation command for the second business object of the second client in response to receiving the operation command from the second client.

Clause 12: The method of Clause 11, further comprising: in response to receiving an operation command for the second business object of the first client, performing an operation on the second business object in the user interface of the first client according to the operation command, and sending the operation command to the second client, to cause the second client to perform the operation on the second business object in the user interface of the second client.

Clause 13: A method of transmitting a business object, the method comprising: establishing a communication connection between a first client and a second client, wherein a user interface of the second client includes a first display region and a second display region, the first display region being used for display a second business object, and the second display region being used for instant communications between the second client and the first client; receiving information of a first business object from the first client by the second client; obtaining the first business object using the information of the first business object; generating a first display sub-region and a second display sub-region in the first display region of the second client; displaying the obtained first business object in the first display sub-region or the second display sub-region; and in response to receiving an operation command for the first business object of the first client from the first client, performing an operation on the first business object in the user interface of the second client according to the operation command.

Clause 14: The method of Clause 13, wherein the second display region includes an instant communication message display sub-region, and the method comprises receiving and displaying an instant communication message sent by the first client, wherein the instant communication message being displayed in at least one of the instant communication message display sub-region, the first display sub-region, or the second display sub-region of the second client.

Clause 15: The method of Clause 14, wherein the second display region further includes an instant communication message input sub-region, and the method further comprises: receiving an instant communication message inputted in the instant communication message input sub-region; and sending the inputted instant communication message to the first client, to cause the first client to display the inputted instant communication message in a user interface of the first client.

Clause 16: The method of any one of Clause 13-15, further comprising: in response to receiving an operation command for the first business object of the second client, performing an operation on the first business object in the user interface of the second client; and sending the operation command to the first client, to cause the first client to perform the operation on the first business object in the user interface of the first client.

Clause 17: The method of any one of Clause 13-15, further comprising: receiving a request for interchanging sharing modes from the first client; sending information of the second business object to the first client, to enable the first client to display the second business object in a user interface of the first client; in response to receiving an operation command for the second business object of the second client, performing an operation on the second business object in the user interface of the second client according to the operation command; and sending the operation command to the first client, to cause the first client to perform the operation on the second business object in a user interface of the first client.

Clause 18: The method of Clause 17, further comprising performing an operation on the second business object in the user interface of the second client according to an operation command for the second business object of the first client in response to receiving the operation command from the first client.

Clause 19: A method of transmitting a business object, the method comprising: establishing communication connections between a first client and at least two second clients, wherein a user interface of the first client includes a first display region and a second display region, the first display region being used for displaying a first business object, and the second display region being used for instant communications between the first client and the at least two second clients; sending information of the first business object to a plurality of second clients according to a sharing request, to cause a second client of the plurality of second clients to display the first business object in a user interface of the second client; and in response to receiving an operation command for the first business object of the first client, performing an operation on the first business object in the user interface of the first client according to the operation command, and sending the operation command to the plurality of second clients, to cause the second client of the plurality of second clients to perform the operation on the first business object on the user interface of the second client according to the operation command.

Clause 20: The method of Clause 19, wherein the second display region includes an instant communication message input sub-region, and the method further comprises: receiving an instant communication message inputted in the instant communication message input sub-region; and sending the instant communication message to the plurality of second clients, to cause the second client of the plurality of second client to display the instant communication message in the user interface of the second client.

Clause 21: The method of Clause 20, wherein the second display region further includes an instant communication message display sub-region, and the method further comprises receiving and displaying instant communication messages sent by the plurality of second clients, wherein the instant communication messages sent by the plurality of second clients are displayed in the instant communication message display sub-region and/or the first display region of the first client.

Clause 22: The method of any one of Clause 19-21, further comprising: for the second client of the plurality of second clients, in response to receiving an operation command for the first business object of the second client from the second client, performing an operation on the first object in the user interface of the first client according to the operation command.

Clause 23: The method of any one of Clause 19-21, further comprising: sending a request for interchanging sharing modes to some or all of the plurality of second clients; receiving second business object information from the some or all of the plurality of second clients, wherein a piece of the second business object information corresponds to a second client; obtaining a respective second business object using each piece of the received second business object information, wherein the obtained second business object is a second business object of a second client corresponding to the respective piece of the second business object information; generating at least two display sub-regions in the first display region; displaying the first business object of the first client and the obtained second business objects in the at least two display sub-regions; for a second client of the some or all of the plurality of second clients, in response to receiving an operation command for the second business object of the second client from the second client, performing an operation on the second business object in the user interface of the first client.

Clause 24: The method of Clause 23, further comprising: in response to receiving an operation command for a second business object of the first client, performing an operation on the second business object in the user interface of the first client according to the operation command, and sending the operation command to a second client to which the second business object belongs, to cause the second client to perform the operation on the second business object in a user interface of the second client according to the operation command.

Clause 25: A method of transmitting a business object, the method comprising: establishing communication connections between a second client and at least two first clients, wherein a user interface of the second client includes a first display region and a second display region, the first display region being used for displaying a second business object, and the second display region being used for instant communications between the second client and the at least two first clients; receiving sharing requests from a plurality of first clients by the second client; receiving first business object information sent from the plurality of first clients; obtaining a respective first business object using each piece of the received first business object information, wherein the obtained first business object is a first business object of a first client corresponding to the respective piece of the first business object information; generating at least two display sub-regions in the first display region; displaying the second business object of the second client and the obtained first business objects in the at least two display sub-regions; for a first client of the plurality of first clients, in response to receiving an operation command for a first business object of the first client from the first client, performing an operation on the first business object in the user interface of the second client.

Clause 26: The method of Clause 25, further comprising: in response to receiving an operation command for a first business object of the second client, performing an operation on the first business object in the user interface of the second client, and sending the operation command to a first client to which the first business object belongs, to cause the first client to perform the operation on the first business object in a user interface of the first client according to the operation command.

Clause 27: The method of Clause 25 or 26, further comprising: receiving requests for interchanging sharing modes from some or all first clients of the plurality of first clients; sending information of the second business object to the some or all first clients, to cause the some or all first clients to display the second business object in a user interface of a first client of the some or all first clients; and in response to receiving an operation command for the second business object of the second client, performing an operation on the second business object in the user interface of the second client according to the operation command, and sending the operation command to the some or all first clients, to cause the first client of the some or all first clients to perform the operation on the second business object in the user interface of the first client.

Clause 28: The method of Clause 27, further comprising: in response to receiving an operation command for the second business object of the first client of the some or all first clients from the first client, performing an operation on the second business object in the user interface of the second client.

Clause 29: A client, wherein a communication connection is established between the first client and a second client, a user interface of the first client includes a first display region and a second display region, the first display region being used for displaying a first business object, and the second display region being used for instant communications between the first client and the second client, the first client comprising: a first sending unit configured to send information of a first business object to a second client according to a sharing request, to cause the second client to display the first business object in a user interface of the second client; an execution unit configured to perform an operation on the first business object in a user interface of the first client according to an operation command in response to receiving the operation command for the first business object of the first client; and a second sending unit configured to send the operation command to the second client, to cause the second client to perform an operation on the first business object in the user interface thereof according to the operation command.

Clause 30: A second client, wherein a communication connection is established between a first client and the second client, a user interface of the second client includes a first display region and a second display region, the first display region being used for displaying a second business object, and the second display region being used for instant communications between the first client and the second client, the second client comprising: a first receiving unit configured to receive sharing requests sent by the first client; a second receiving unit configured to receive first business object information sent by the first client; an acquisition unit configured to obtain a first business object using the first business object information; a generation unit configured to generate a first display sub-region and a second display sub-region in the first display region; a display unit configured to display the obtained first business object in the first display sub-region or the second display sub-region; and an execution unit configured to perform an operation on the first business object in the user interface of the second client according to an operation command for the first business object of the first client in response to receiving the operation command from the first client.

Clause 31: A first client, wherein communication connections are established between the first client and at least two second clients, a user interface of the first client includes a first display region and a second display region, the first display region being used for displaying a first business object, and the second display region being used for instant communications between the first client and the at least two second clients, and wherein the first client comprises: a first sending unit configured to send information of the first business object to a plurality of second clients, to enable a second client of the plurality of second clients to display the first business object in a user interface of the second client; an execution unit configured to perform an operation on the first business object in the user interface of the first client according to an operation command for the first business object in response to receiving the operation command; and a second sending unit configured to send the operation command to the plurality of second clients, to cause the second client of the plurality of second clients to perform the operation on the first business object in the user interface of the second client according to the operation command.

Clause 32: A second client, wherein communication connections are established between the second client and at least two first clients, a user interface of the second client includes a first display region and a second display region, the first display region being used for displaying a second business object, and the second display region being used for instant communications between the second client and the at least two first clients, and wherein the second client comprises: a first receiving unit configured to receive sharing requests sent by a plurality of first clients; a second receiving unit configured to receive first business object information sent by the plurality of first clients; an acquisition unit configured to obtain a first business object using each piece of the first business object information, wherein the obtained first business object is a first business object of a first client corresponding to the respective piece of the first business object information; a generation unit configured to generate at least two display sub-regions in a first display region; a display unit configured to display a second business object of the second client and the obtained first business objects in the at least two display sub-regions; and an execution unit configured to perform an operation on a first business object in the user interface of the second client according to an operation command in response to receiving the operation command for the first business object of a first client from the first client, the first client being one of the plurality of first clients.

What is claimed is:

1. A method implemented by a first client, the method comprising:
    sending information of a time-limited first business object obtained from a server to the second client according to a sharing request, to cause the second client to obtain the first business object from the server over a network and display the first business object in a user interface of the second client;
    performing a first operation causing a change on the first business object as displayed in a user interface of the first client according to a first operation command for the first business object of the first client;
    waiting for a defined time period starting from a time point of the first operation command; and
    sending a reduced data transmission comprising a plurality of operation commands input upon the first business object during the defined time period, the plurality of operation commands including the first operation command, to the second client, to cause the second client to perform the first operation within a time limit of the first business object, causing a change on the first business object as displayed in the user interface of the second client according to the first operation command;
    wherein the first operation does not act upon the first business object at the server; and
    wherein the information of the first business object and the first operation command are transmitted over a high-timeliness dedicated connection among a plurality of communication connections between the first client and the second client.

2. The method of claim 1, wherein the user interface of the first client includes an instant communication message input sub-region, and the method further comprises:
    receiving an instant communication message inputted in the instant communication message input sub-region; and
    sending the instant communication message to the second client, to cause the second client to display the instant communication message in the user interface of the second client.

3. The method of claim 2, wherein the user interface of the first client further includes an instant communication message display sub-region, and the method further comprises receiving and displaying one or more instant communication messages sent by the second client, the one or more instant communication messages being displayed in the instant communication message display sub-region.

4. The method of claim 2, wherein communication connections are established between the first client and the second client, the communication connections including a sharing connection and an instant communication connection, wherein the sharing connection is used for transmission of at least one of the information of the first business object or the first operation command, and the instant communication connection is used for transmission of at least one of the instant communication message or the information of the first business object.

5. The method of claim 2, wherein an instant communication connection is established between the first client and the second client, the instant communication connection being used for transmission of the information of the first business object, the first operation command, and the instant communication message.

6. The method of claim 1, further comprising: receiving contact information selected from a contact list of the first client, the second client corresponding to the selected contact information; and generating a user interface of the first client.

7. The method of claim 1, wherein a communication connection is established by a server between the first client and the second client, the information of the first business object includes an identifier of the first business object, and sending the information of the first business object to the second client according to the sharing request comprises sending the identifier of the first business object to the server according to the sharing request, to cause the server to obtain a link associated with the first business object corresponding to the identifier of the first business object from stored correspondence relationships between identifiers of business objects and links associated with the business objects, and to send the obtained link associated with the first business object to the second client.

8. The method of claim 1, wherein the first operation command is inputted via a touch screen of the first client, and the operation command comprises at least one of a sliding command, a zoom-in command, a zoom-out command, a dragging command, or a selection command.

9. The method of claim 1, further comprising performing a second operation on the first business object in the user interface of the first client according to a second operation command for the first business object of the second client in response to receiving the first operation command from the second client.

10. The method of claim 1, further comprising:
    sending a request for interchanging sharing modes to the second client;
    receiving information of a second business object from the second client;
    obtaining the second business object using the information of the second business object;
    generating a first display sub-region and a second display sub-region in the user interface of the first client;
    displaying the first business object of the first client and the obtained second business object in the first display sub-region and the second display sub-region; and
    performing a third operation on the second business object in the user interface of the first client according to a third operation command for the second business object of the second client in response to receiving the third operation command from the second client.

11. The method of claim 1, further comprising generating the user interface of the first client, the user interface of the first client including a first display region and a second display region, the first display region being used for displaying the first business object, and the second display region being used for instant communications between the first client and the second client.

12. The method of claim 11, further comprising: in response to receiving a fourth operation command for the second business object of the first client, performing a fourth operation on the second business object in the user interface of the first client according to the fourth operation command, and sending the fourth operation command to the second client, to cause the second client to perform the fourth operation on the second business object in the user interface of the second client.

13. One or more computer-readable media storing executable instructions that, when executed by one or more processors of a first client, cause the one or more processors to perform acts comprising:

sending information of a time-limited first business object obtained from a server to a plurality of second clients according to a sharing request, to cause a second client of the plurality of second clients to obtain the first business object from a server over a network and display the first business object in a user interface of the second client; and in response to receiving a reduced data transmission comprising a plurality of operation commands input upon the first business object during a defined time period starting from a time point of a first operation command, the plurality of operation commands including the first operation command, for the first business object of the first client, performing a first operation causing a change on the first business object as displayed in the user interface of the first client according to the first operation command, and sending the first operation command to the plurality of second clients, to cause the second client of the plurality of second clients to perform the first operation within a time limit of the first business object, causing a change on the first business object as displayed on the user interface of the second client according to the first operation command;

wherein the first operation does not act upon the first business object at the server; and wherein the information of the first business object and the first operation command are transmitted over a high-timeliness dedicated connection among a plurality of communication connections between the first client and the second client.

14. The one or more computer-readable media of claim 13, wherein the user interface of the first client includes an instant communication message input sub-region, and the acts further comprise:

receiving an instant communication message inputted in the instant communication message input sub-region; and sending the instant communication message to the plurality of second clients, to cause the second client of the plurality of second client to display the instant communication message in the user interface of the second client.

15. The one or more computer-readable media of claim 14, wherein the user interface of the first client further includes an instant communication message display sub-region, and the acts further comprise receiving and displaying instant communication messages sent by the plurality of second clients, wherein the instant communication messages sent by the plurality of second clients are displayed in the instant communication message display sub-region.

16. The one or more computer-readable media of claim 13, the acts further comprising performing a second operation on the first object in the user interface of the first client according to a second operation command for the first business object of the second client in response to receiving the second operation command from the second client.

17. The one or more computer-readable media of claim 13, the acts further comprising:

sending a request for interchanging sharing modes to one or more second clients of the plurality of second clients;

receiving second business object information from the one or more second clients, wherein a piece of the second business object information corresponds to a particular second client of the one or more second clients;

obtaining one or more second business objects using the received second business object information;

generating at least two display sub-regions in the user interface of the first client;

displaying the first business object of the first client and the one or more second business objects in the at least two display sub-regions; and performing a third operation on a particular second business object of the one or more second business objects in the user interface of the first client according to a third operation command for the particular second business object in response to receiving the third operation command from a particular second client to which the particular second business object belongs.

18. The one or more computer-readable media of claim 17, the acts further comprising:

performing a fourth operation on the particular second business object in the user interface of the first client according to a fourth operation command in response to receiving the fourth operation command for the particular second business object of the first client; and sending the fourth operation command to the particular second client to which the particular second business object belongs, to cause the particular second client to perform the fourth operation on the particular second business object in a user interface of the particular second client according to the fourth operation command.

19. A second client comprising:

one or more processors;

memory;

a first receiving unit stored in the memory and executable by the one or more processors to receive sharing requests sent by a plurality of first clients;

a second receiving unit stored in the memory and executable by the one or more processors to receive first business object information of a plurality of time-limited first business objects obtained from a server sent by the plurality of first clients;

an acquisition unit stored in the memory and executable by the one or more processors to obtain a plurality of first business objects from the server over a network using the first business object information;

a generation unit stored in the memory and executable by the one or more processors to generate at least two display sub-regions in a user interface of the second client;

a display unit stored in the memory and executable by the one or more processors to display a second business object of the second client and the one or more first business objects in the at least two display sub-regions; and an execution unit stored in the memory and executable by the one or more processors to perform an operation within a time limit of a first business object of the one or more first business objects, causing a change on the first business object of the one or more first business objects as displayed in the user interface of the second client according to a first operation command for the first business object in response to receiving a reduced data transmission comprising a plurality of operation commands input upon the first business object during a defined time period starting from a time point of the first operation command, the plurality of operation commands including the first operation command, from a corresponding first client to which the first business object belongs;

wherein the operation does not act upon the plurality of first business objects at the server; and wherein the information of the one or more first business objects and the first operation command are transmitted over a high-timeliness dedicated connection among a plurality of communication connections between the first client and the second client.

20. The second client of claim 19, wherein communication connections are established between the second client and the plurality of first clients, the user interface of the second client includes a first display region and a second display region, the first display region including the at least two display sub-regions and being used for displaying the second business object, and the second display region being used for instant communications between the second client and the plurality of first clients.

* * * * *